(12) United States Patent
Fujiwara et al.

(10) Patent No.: US 12,308,763 B2
(45) Date of Patent: May 20, 2025

(54) POWER CONVERSION DEVICE

(71) Applicant: Mitsubishi Electric Corporation, Tokyo (JP)

(72) Inventors: Shuhei Fujiwara, Tokyo (JP); Yoshiyuki Kono, Tokyo (JP); Ryosuke Uda, Tokyo (JP); Takuya Kajiyama, Tokyo (JP); Toshiyuki Fujii, Tokyo (JP); Shigeo Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 435 days.

(21) Appl. No.: 17/774,990

(22) PCT Filed: Dec. 2, 2019

(86) PCT No.: PCT/JP2019/047045
§ 371 (c)(1),
(2) Date: May 6, 2022

(87) PCT Pub. No.: WO2021/111502
PCT Pub. Date: Jun. 10, 2021

(65) Prior Publication Data
US 2022/0393616 A1 Dec. 8, 2022

(51) Int. Cl.
*H02M 7/5395* (2006.01)
*H02M 1/00* (2007.01)
*H02M 7/483* (2007.01)

(52) U.S. Cl.
CPC ....... *H02M 7/5395* (2013.01); *H02M 1/0006* (2021.05); *H02M 1/0009* (2021.05); *H02M 1/007* (2021.05); *H02M 7/4835* (2021.05)

(58) Field of Classification Search
CPC ...... H02M 7/48; H02M 1/0006; H02M 7/483; H02M 7/4833; H02M 7/4835; H02M 1/007; H02M 1/0009
See application file for complete search history.

(56) References Cited

U.S. PATENT DOCUMENTS 11,601,064 B2 * 3/2023 Hario .................. H02M 7/4835
12,015,354 B2 * 6/2024 Kajiyama .............. H02M 7/49
(Continued)

FOREIGN PATENT DOCUMENTS

EP 3627684 A1 3/2020
EP 3905504 A1 11/2021
(Continued)

OTHER PUBLICATIONS

English Machine Translation.*
Extended European Search Report issued in corresponding European Patent Application No. 19955330.6, mailed on Oct. 26, 2022, 13 pages.
Galarza, Jose, "Study of the Estimated Capacitor Voltage by Kalman Filter for a Modular Multi-Level Converter", 2019 IEEE XXVI International Conference on Electronics, Electrical Engineering and Computing (Intercon), XP033624122, Aug. 12, 2019, pp. 1-4.
(Continued)

*Primary Examiner* — Thienvu V Tran
*Assistant Examiner* — Yahveh Comas Torres
(74) *Attorney, Agent, or Firm* — Buchanan Ingersoll & Rooney PC

(57) ABSTRACT

A voltage evaluation value generator receives voltage detection values of power storage elements of all of converter cells included in a power converter and generates a first voltage evaluation value of each power storage element of all of the converter cells and a second voltage evaluation value of each power storage element in a plurality of converter cells included in each of a plurality of groups obtained by classifying all of the converter cells in advance, without using a mean value of voltage detection values. A voltage macro controller uses the voltage evaluation value to calculate a control value set in common to at least the converter cells in the same group for controlling deficiency and excess of stored energy in all of the converter cells and the converter cells in each group.

14 Claims, 15 Drawing Sheets

(56) References Cited

U.S. PATENT DOCUMENTS

2010/0020577 A1    1/2010  Dommaschk et al.
2017/0027025 A1*   1/2017  Kanai .................... H05B 6/06
2022/0014114 A1*   1/2022  Kajiyama ........... H02M 7/4833

FOREIGN PATENT DOCUMENTS

| JP | 4999930 B2    | 8/2012  |                    |
|----|---------------|---------|--------------------|
| JP | 5455055 B2    | 3/2014  |                    |
| JP | 5721096 B2    | 5/2015  |                    |
| JP | 6377310 B1 *  | 8/2018  | ............ H02M 7/483 |
| JP | 6545425 B1 *  | 7/2019  | .......... H02M 1/0025 |
| JP | 6559387 B1 *  | 8/2019  | ............. H02M 1/12 |
| WO | 2018211624 A1 | 11/2018 |                    |
| WO | 2019138550 A1 | 7/2019  |                    |

OTHER PUBLICATIONS

Communication pursuant to Article 94(3) EPC dated Sep. 7, 2023, issued in the corresponding European Patent Application No. 19955330.6, 6 pages.

International Search Report (PCT/ISA/210) with translation and Written Opinion (PCT/ISA/237) mailed on Feb. 25, 2020, by the Japan Patent Office as the International Searching Authority for International Application No. PCT/JP2019/047045.

* cited by examiner

POWER CONVERSION DEVICE

TECHNICAL FIELD

The present disclosure relates to a power conversion device.

BACKGROUND ART

Modular multilevel converters (MMCs) including a plurality of unit converters (hereinafter referred to as "converter cells") connected in cascade are known as large-capacity power conversion devices installed in power systems. Typically, a converter cell includes a plurality of switching elements and a power storage element (typically, capacitor).

In a modular multilevel converter, the voltage of a power storage element (capacitor voltage) of each individual converter cell need be maintained in the vicinity of a target value in order to obtain a desired control output. If the capacitor voltage falls out of the target value, the output voltage of the converter cell is not as instructed, so that the control characteristics may be deteriorated, for example, due to occurrence of not-intended circulating current. In a serious case, the capacitor voltage excessively rises or excessively lowers to the level of overvoltage (OV) protection or undervoltage (UV) protection in any converter cell, which may cause the MMC to stop operating.

The capacitor voltage is usually controlled in multi levels by capacitor voltage control of each individual converter cell (which hereinafter may be referred to as "individual control") as well as by control of converter cells as a whole in the MMC (which hereinafter may be referred to as "all voltage control") and balance control between certain groups (for example, arms or phases).

For example, Japanese Patent No. 4999930 (PTL 1) describes control using the mean value (entire mean value) of capacitor voltages of all submodules and the mean value of capacitor voltage in each phase module (phase mean value) in a power conversion device having a plurality of phase modules in which a plurality of submodules (converter cells) are cascaded. Specifically, control of suppressing non-uniformity of stored energy between phases is performed by feedback control of reducing a deviation between a reference value obtained by dividing the entire mean value by the number of phases and a phase mean value.

CITATION LIST

Patent Literature

PTL 1: Japanese Patent No. 4999930

SUMMARY OF INVENTION

Technical Problem

The all voltage control and the balance control between groups suppress deficiency and excess of stored energy in the capacitors in the entire power converter and in a certain group. A control value of the deficiency and excess is therefore reflected in common to the converter cells as a whole and a plurality of converter cells in a certain group.

PTL 1 describes the use of the mean value of capacitor voltages of a plurality of converter cells as an evaluation value for stored energy in the converter cells as a whole or a plurality of converter cells in a certain group.

Unfortunately, with an evaluation value based on a simple mean value, the controllability may be insufficient in terms of avoiding OV protection or UV protection because information on a converter cell having a large degree of charge or discharge among the converter cells is not reflected in the evaluation value. In another respect, if determination of the evaluation value is dependent only on the detection value of the capacitor voltage, the controllability may be deteriorated due to delay in detection of deficiency and excess, because the capacitor voltage is changed as the result of actual deficiency and excess of stored energy.

The present disclosure is made in order to solve such a problem, and an object of the present disclosure is to improve the controllability of the power conversion device by appropriately calculating an evaluation value of the capacitor voltages of a plurality of converter cells for controlling stored energy in units of a plurality of converter cells.

Solution to Problem

According to an aspect of the present disclosure, a power conversion device includes a power converter and a control device to control the power converter. The power converter includes at least one arm having multiple converter cells cascaded to each other. Each of the converter cells includes a pair of input and output terminals, a plurality of switching elements, a power storage element, and a voltage detector to detect a voltage of the power storage element. The power storage element is electrically connected to the input and output terminals through the switching elements. The control device includes a voltage macro controller and a voltage evaluation value generator. The voltage macro controller controls at least one of: deficiency and excess of stored energy of the power storage elements by all of the converter cells that constitute the power converter; and deficiency and excess of stored energy of the power storage elements by a plurality of converter cells included in each of a plurality of groups obtained by classifying the all of the converter cells in advance. The voltage evaluation value generator calculates at least one of: a voltage evaluation value of each power storage element different from a mean value of respective voltage detection values of the power storage elements, for the all of the converter cells; and a voltage evaluation value of each power storage element different from a mean value of respective voltage detection values of the power storage elements, for the plurality of converter cells in each of the groups. In particular, the voltage macro controller calculates a control value set in common to at least the plurality of converter cells for controlling deficiency and excess of the stored energy, based on the voltage evaluation value from the voltage evaluation value generator.

Advantageous Effects of Invention

The present disclosure can improve the controllability of the power conversion device by appropriately calculating an evaluation value of the capacitor voltages of a plurality of converter cells for controlling stored energy in units of a plurality of converter cells, using a method different from a simple mean value.

DESCRIPTION OF EMBODIMENTS

Figure 1:
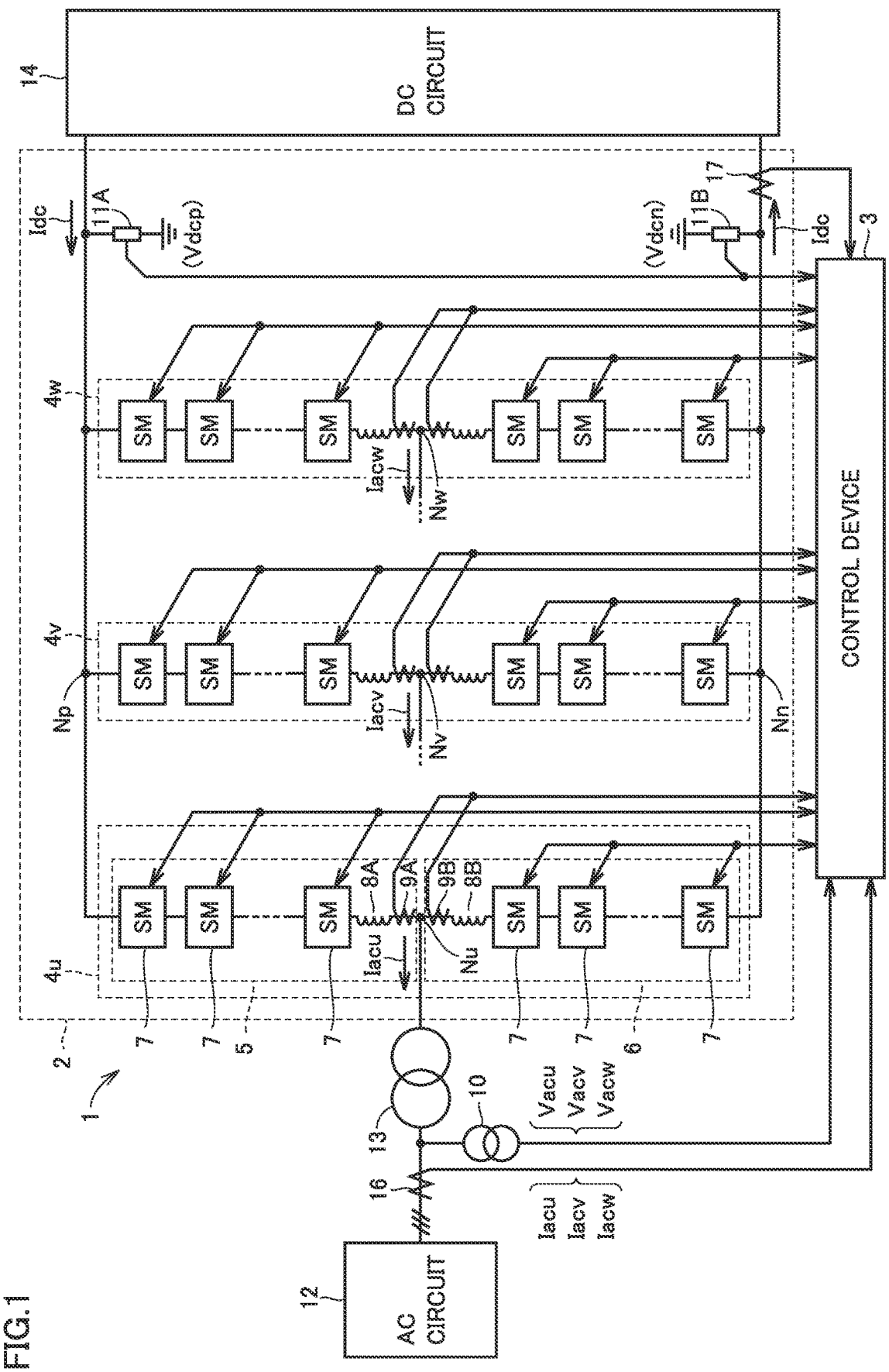
FIG. 1 is a schematic configuration diagram of a power conversion device according to the present embodiment.

Embodiments of the present disclosure will be described in detail below with reference to the drawings. In the following, like or corresponding parts in the drawings are denoted by like reference signs and a description thereof is basically not repeated.

First Embodiment (Overall Configuration of Power Conversion Device)

FIG. 1 is a schematic configuration diagram of a power conversion device 1 according to the present embodiment.

Referring to FIG. 1, power conversion device 1 is configured with a modular multilevel converter (MMC) including a plurality of converter cells connected in series to each other. The "converter cell" may be referred to as "submodule", SM, or "unit converter". Power conversion device 1 performs power conversion between a DC circuit 14 and an AC circuit 12. Power conversion device 1 includes a power converter 2 and a control device 3.

Power converter 2 includes a plurality of leg circuits 4u, 4v, and 4w (denoted as leg circuit 4 when they are collectively referred to or any one of them is referred to) connected in parallel with each other between a positive DC terminal (that is, high potential-side DC terminal) Np and a negative DC terminal (that is, low potential-side DC terminal) Nn.

Leg circuit 4 is provided for each of a plurality of phases forming alternating current. Leg circuit 4 is connected between AC circuit 12 and DC circuit 14 to perform power conversion between those circuits. In FIG. 1, AC circuit 12 is a three-phase alternating current system, and three leg circuits 4u, 4v, and 4w are provided respectively corresponding to U phase, V phase, and W phase.

AC input terminals Nu, Nv, and Nw respectively provided for leg circuits 4u, 4v, and 4w are connected to AC circuit 12 through a transformer 13. AC circuit 12 is, for example, an AC power system including an AC power source. In FIG. 1, for simplification of illustration, the connection between AC input terminals Nv, Nw and transformer 13 is not shown.

High potential-side DC terminal Np and low potential-side DC terminal Nn connected in common to leg circuits 4 are connected to DC circuit 14. DC circuit 14 is, for example, a DC power system including a DC power transmission network or a DC terminal of another power conversion device. In the latter case, two power conversion devices are coupled to form a back to back (BTB) system for connecting AC power systems having different rated frequencies.

AC circuit 12 may be connected through an interconnecting reactor, instead of using transformer 13 in FIG. 1. Furthermore, instead of AC input terminals Nu, Nv, and Nw, leg circuits 4u, 4v, and 4w may be provided with respective primary windings, and leg circuits 4u, 4v, and 4w may be connected in terms of alternating current to transformer 13 or the interconnecting reactor through secondary windings magnetically coupled to the primary windings. In this case, the primary windings may be reactors 8A and 8B described below. Specifically, leg circuits 4 are electrically (that is, in terms of direct current or alternating current) connected to AC circuit 12 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC circuit 14. Leg circuits 4v and 4w have a similar configuration, and hereinafter the configuration of leg circuit 4u is explained as a representative example.

Upper arm 5 includes a plurality of converter cells 7 connected in cascade and a reactor 8A. Converter cells 7 and reactor 8A are connected in series. Similarly, lower arm 6 includes a plurality of converter cells 7 connected in cascade and a reactor 8B. Converter cells 7 and reactor 8B are connected in series. In the following description, the number of converter cells 7 included in each of upper arm 5 and lower arm 6 is denoted as Ncell. Ncell is ≥2.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided. The inductances of the reactors may be different from each other. Only reactor 8A of upper arm 5 or only reactor 8B of lower arm 6 may be provided. The transformer connection may be adjusted to cancel the magnetic flux of DC component current, and leakage reactance of the transformer may act on AC component current, as an alternative to the reactor. The provision of reactors 8A and 8B can suppress abrupt increase of accident current at a time of an accident in AC circuit 12 or DC circuit 14.

Power conversion device 1 further includes an AC voltage detector 10, an AC current detector 16, DC voltage detectors 11A and 11B, and arm current detectors 9A and 9B provided for each leg circuit 4, as detectors for measuring the quantity of electricity (current, voltage, etc.) used in control. Signals detected by these detectors are input to control device 3.

In FIG. 1, the signal lines of signals input from the detectors to control device 3 and the signal lines of signals input and output between control device 3 and converter cells 7 are depicted partially collectively for the sake of ease of illustration, but, in actuality, they are provided individually for each detector and each converter cell 7. Signal lines between each converter cell 7 and control device 3 may be provided separately for transmission and reception. The signal lines are formed with, for example, optical fibers.

The detectors will now be specifically described.

AC voltage detector 10 detects U-phase AC voltage Vacu, V-phase AC voltage Vacv, and W-phase AC voltage Vacw of AC circuit 12. In the following description, Vacu, Vacv, and Vacw may be collectively referred to as Vac.

AC current detector 16 detects U-phase AC current Iacu, V-phase AC current Iacv, and W-phase AC current Iacw of AC circuit 12. In the following description, Iacu, Iacv, and Iacw may be collectively referred to as Iac.

DC voltage detector 11A detects DC voltage Vdcp at high potential-side DC terminal Np connected to DC circuit 14. DC voltage detector 11B detects DC voltage Vdcn at low potential-side DC terminal Nn connected to DC circuit 14. The difference between DC voltage Vdcp and DC voltage Vdcn is defined as DC voltage Vdc. DC voltage detector 17 detects DC current Idc flowing through high potential-side DC terminal Np or low potential-side DC terminal Nn.

Arm current detectors 9A and 9B provided in leg circuit 4u for U phase respectively detect upper arm current Ipu flowing through upper arm 5 and lower arm current Inu flowing through lower arm 6. Arm current detectors 9A and 9B provided in leg circuit 4v for V phase respectively detect upper arm current Ipv and lower arm current Inv. Arm current detectors 9A and 9B provided in leg circuit 4w for W phase respectively detect upper arm current Ipw and lower arm current Inw. In the following description, upper arm currents Ipu, Ipv, and Ipw may be collectively referred to as upper arm current Iarmp, lower arm currents Inu, Inv, and Inw may be collectively referred to as lower arm current Iarmn, and upper arm current Iarmp and lower arm current Iarmn may be collectively referred to as Iarm.

(Configuration Example of Converter Cell)

Figure 2:
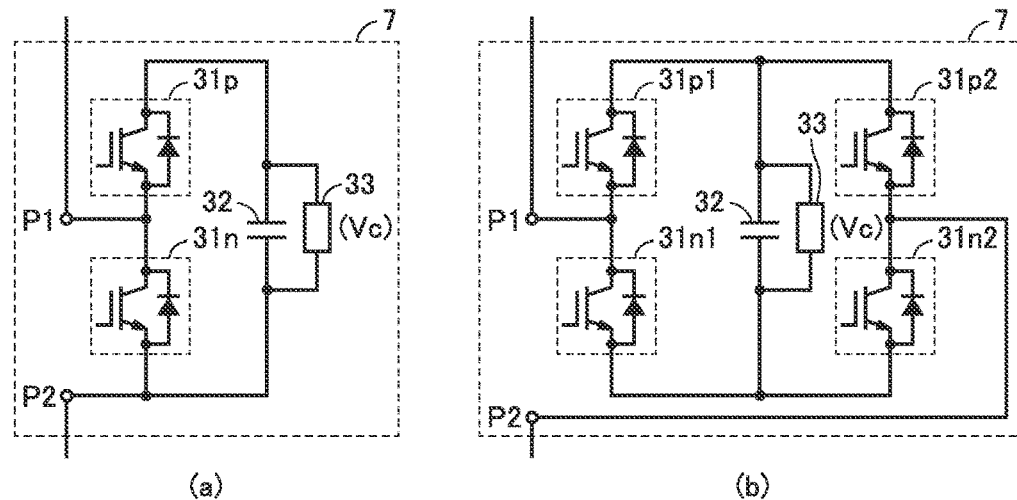
FIG. 2 is a circuit diagram illustrating a configuration example of a converter cell that constitutes a power converter shown in FIG. 1.

FIG. 2(a) and FIG. 2(b) are circuit diagrams showing a configuration example of converter cell 7 that constitutes power converter 2.

Converter cell 7 shown in FIG. 2(a) has a circuit configuration called half bridge configuration. This converter cell 7 includes a series of two switching elements 31p and 31n connected in series, a power storage element 32, a voltage detector 33, and input/output terminals P1 and P2. The series of switching elements 31p and 31n and power storage element 32 are connected in parallel. Voltage detector 33 detects voltage Vc between both ends of power storage element 32.

Both terminals of switching element 31n are connected to input/output terminals P1 and P2. With switching operation of switching elements 31p and 31n, converter cell 7 outputs voltage Vc of power storage element 32 or zero voltage between input/output terminals P1 and P2. When switching element 31p is turned ON and switching element 31n is turned OFF, voltage Vc of power storage element 32 is output from converter cell 7. When switching element 31p is turned OFF and switching element 31n is turned ON, converter cell 7 outputs zero voltage.

Converter cell 7 shown in FIG. 2(b) has a circuit configuration called full bridge configuration. This converter cell 7 includes a first series of two switching elements 31p1 and 31n1 connected in series, a second series of two switching elements 31p2 and 31n2 connected in series, a power storage element 32, a voltage detector 33, and input/output terminals P1 and P2. The first series, the second series, and power storage element 32 are connected in parallel. Voltage detector 33 detects voltage Vc between both ends of power storage element 32.

The middle point of switching element 31p1 and switching element 31n1 is connected to input/output terminal P1. Similarly, the middle point of switching element 31p2 and switching element 31n2 is connected to input/output terminal P2. With switching operation of switching elements 31p1, 31n1, 31p2, and 31n2, converter cell 7 outputs voltage Vc, −Vc of power storage element 32 or zero voltage between input/output terminals P1 and P2.

In FIG. 2(a) and FIG. 2(b), switching elements 31p, 31n, 31p1, 31n1, 31p2, and 31n2 are configured, for example, such that a freewheeling diode (FWD) is connected in anti-parallel with a self-turn-off semiconductor switching element such as an insulated gate bipolar transistor (IGBT) or a gate commutated turn-off (GCT) thyristor.

In FIG. 2(a) and FIG. 2(b), a capacitor such as a film capacitor is mainly used for power storage element 32. Power storage element 32 may hereinafter be called capacitor. In the following, voltage Vc of power storage element 32 may be referred to as capacitor voltage Vc.

As shown in FIG. 1, converter cells 7 are connected in cascade. In each of FIG. 2(a) and FIG. 2(b), in converter cell 7 arranged in upper arm 5, input/output terminal P1 is connected to input/output terminal P2 of adjacent converter cell 7 or high potential-side DC terminal Np, and input/output terminal P2 is connected to input/output terminal P1 of adjacent converter cell 7 or AC input terminal Nu. Similarly, in converter cell 7 arranged in lower arm 6, input/output terminal P1 is connected to input/output terminal P2 of adjacent converter cell 7 or AC input terminal Nu, and input/output terminal P2 is connected to input/output terminal P1 of adjacent converter cell 7 or low potential-side DC terminal Nn.

In the following, converter cell 7 has the half bridge cell configuration shown in FIG. 2(a), and a semiconductor switching element is used as a switching element, and a capacitor is used as a power storage element, by way of example. However, converter cell 7 that constitutes power converter 2 may have the full bridge configuration shown in FIG. 2(b). A converter cell having a configuration other than those illustrated in the examples above, for example, a converter cell having a circuit configuration called clamped double cell may be used, and the switching element and the power storage element are also not limited to the examples above.

(Control Device)

Figure 3:
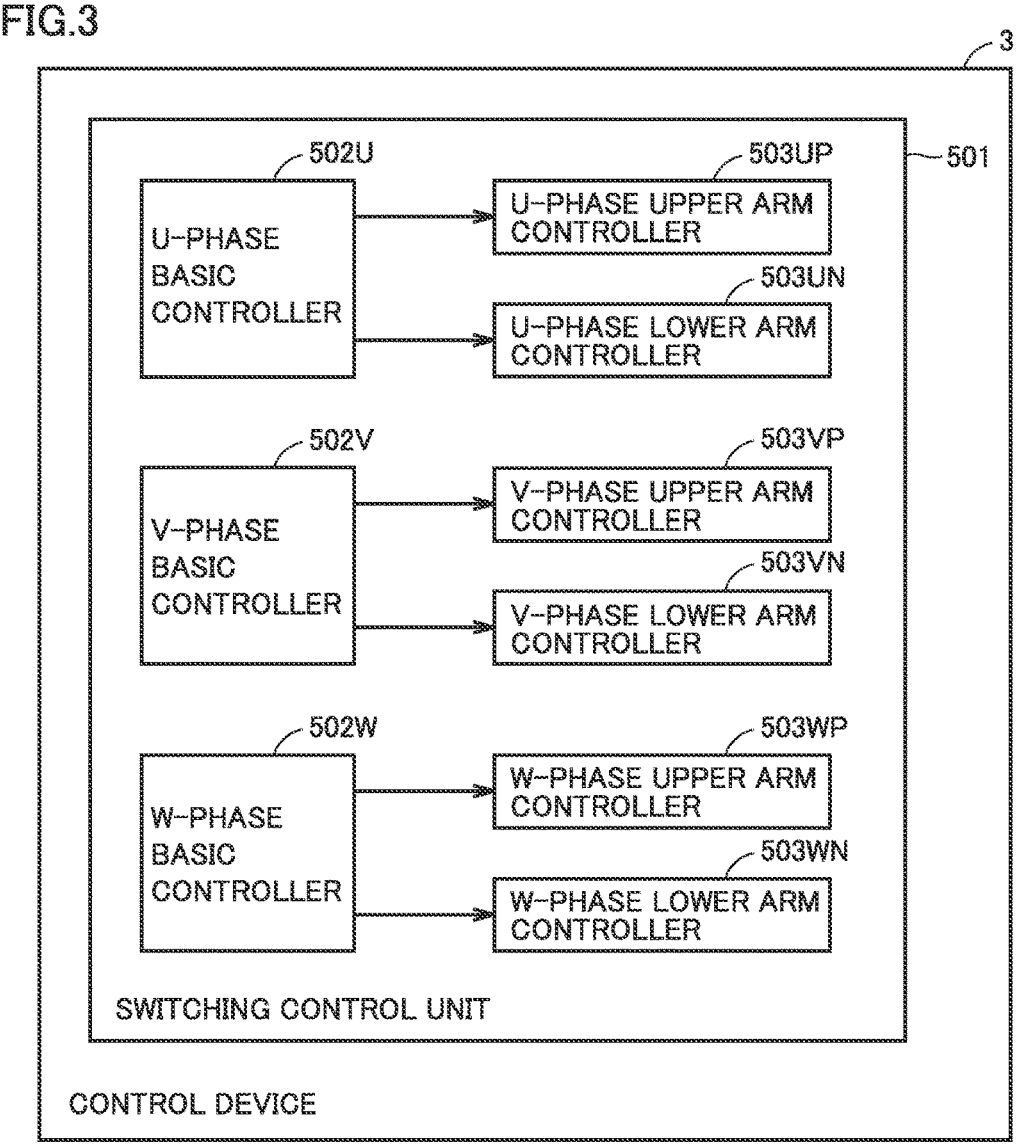
FIG. 3 is a functional block diagram illustrating an internal configuration of a control device shown in FIG. 1.

FIG. 3 is a functional block diagram illustrating an internal configuration of control device 3 shown in FIG. 1.

Referring to FIG. 3, control device 3 includes a switching control unit 501 for controlling ON and OFF of switching elements 31p and 31n of each converter cell 7.

Switching control unit 501 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, and a W-phase lower arm controller 503WN.

In the following description, U-phase basic controller 502U, V-phase basic controller 502V, and W-phase basic controller 502W may be collectively referred to as basic controller 502. Similarly, U-phase upper arm controller 503UP, U-phase lower arm controller 503UN, V-phase upper arm controller 503VP, V-phase lower arm controller 503VN, W-phase upper arm controller 503WP, and W-phase lower arm controller 503WN may be collectively referred to as arm controller 503.

Figure 4:
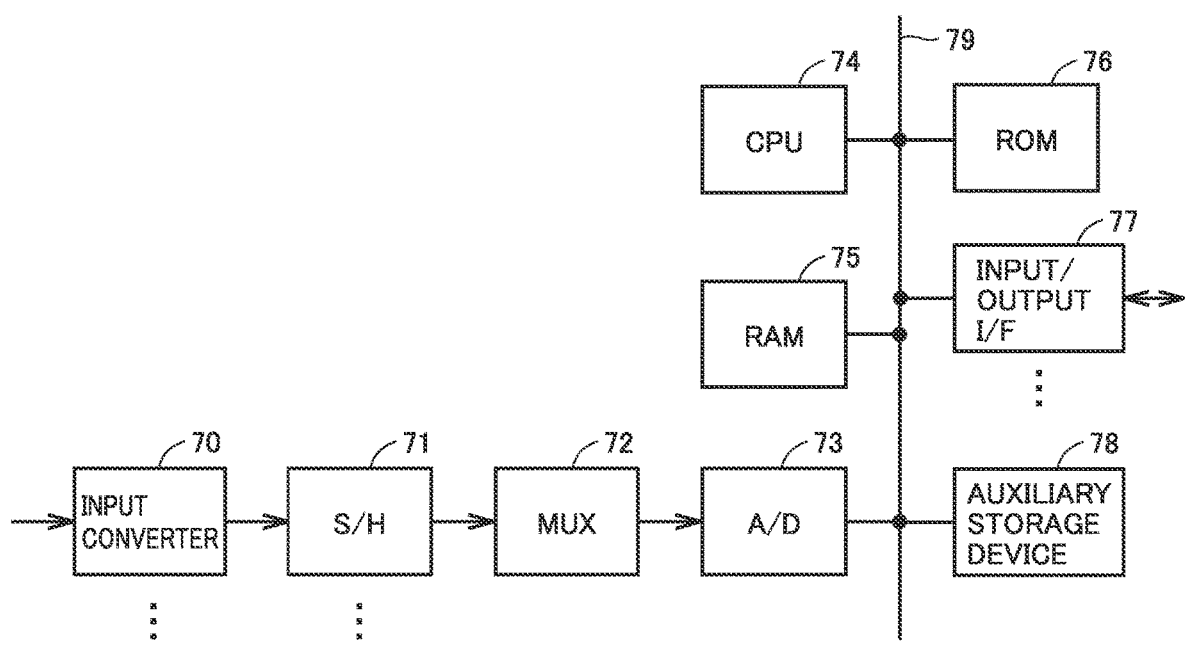
FIG. 4 is a block diagram showing a hardware configuration example of the control device shown in FIG. 1.

FIG. 4 shows a hardware configuration example of the control device. FIG. 4 shows an example in which control device 3 is configured with a computer.

Referring to FIG. 4, control device 3 includes one or more input converters 70, one or more sample hold (S/H) circuits 71, a multiplexer (MUX) 72, and an A/D converter 73. Control device 3 further includes one or more central processing units (CPU) 74, random access memory (RAM) 75, and read only memory (ROM) 76. Control device 3 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal having a voltage level suitable for subsequent signal processing.

Sample hold circuit 71 is provided for each input converter 70. Sample and hold circuit 71 samples and holds a signal representing the electrical quantity received from the corresponding input converter 70 at a predetermined sampling frequency.

Multiplexer 72 successively selects the signals held by a plurality of sample hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 3 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example in FIG. 3, at least a part of control device 3 may be configured using circuitry such as a field programmable gate array (FPGA) and an application specific integrated circuit (ASIC). That is, the function of each functional block illustrated in FIG. 3 may be configured based on the computer illustrated in FIG. 4 or may be at least partially configured with circuitry such as an FPGA and an ASIC. At least a part of the function of each functional block may be configured with an analog circuit.

Figure 5:
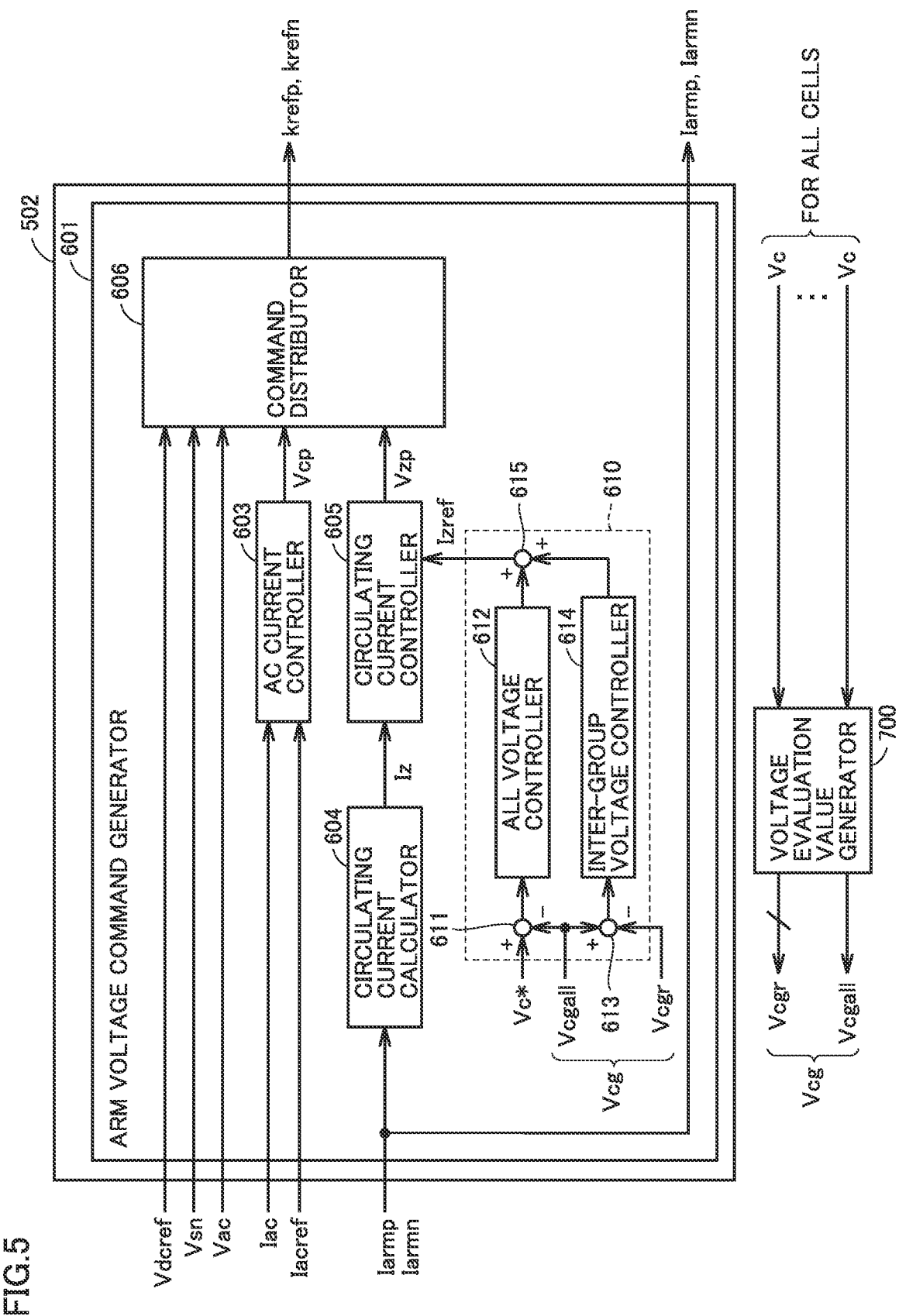
FIG. 5 is a block diagram illustrating a configuration example of a basic controller shown in FIG. 3.

FIG. 5 is a block diagram illustrating a configuration example of basic controller 502 shown in FIG. 3.

Referring to FIG. 5, basic controller 502 includes an arm voltage command generator 601. Control device 3 further includes a voltage evaluation value generator 700 to generate a voltage evaluation value Vcg to be used in arm voltage command generator 601.

Arm voltage command generator 601 calculates an arm voltage command value krefp for the upper arm and an arm voltage command value krefn for the lower arm. In the following description, krefp and krefn are collectively referred to as kref.

Voltage evaluation value generator 700 receives capacitor voltage Vc detected by voltage detector 33 in each converter cell 7. Voltage evaluation value generator 700 generates, from capacitor voltage Vc of each converter cell 7, an all voltage evaluation value Vcgall for evaluating the total sum of stored energy of capacitors 32 of all converter cells 7 in power converter 2 and a group voltage evaluation value Vcgr indicating the total sum of stored energy of capacitors 32 of converter cells 7 in each of predetermined groups.

For example, group voltage evaluation value Vcgr includes a U-phase voltage evaluation value Vcgu, a V-phase voltage evaluation value Vcgv, and a V-phase voltage evaluation value Vcgv for evaluating the total sum of stored energy of a plurality of (2×Necll) converter cells 7 included in each of leg circuits 4u (U phase), 4v (V phase), and 4w (W phase). Alternatively, instead of or in addition to the voltage evaluation value for each leg circuit 4 (U phase, V phase, W phase), group voltage evaluation value Vcgr may include group voltage evaluation value Vcgr for evaluating the total sum of stored energy of a plurality of (Necll) converter cells 7 for each of upper arm 5 and lower arm 6 for each leg circuit 4. In the present embodiment, all voltage evaluation value Vcgall and group voltage evaluation value Vcgr generated by voltage evaluation value generator 700 are collectively referred to as voltage evaluation value Vcg.

In PTL 1, these voltage evaluation values Vcg are determined as the mean value of capacitor voltages Vc of all of converter cells 7 in power converter 2 or the mean value of capacitor voltages Vc of a plurality of converter cells 7 belonging to each group (each phase leg circuit or each arm). In the present embodiment, the stored energy is controlled by calculating an evaluation value different from the mean value. A configuration example of voltage evaluation value generator 700 will be described in detail later.

Arm voltage command generator 601 includes an AC current controller 603, a circulating current calculator 604, a circulating current controller 605, a command distributor 606, and a voltage macro controller 610.

AC current controller 603 calculates an AC control command value Vcp such that the deviation between the detected AC current Iac and the set AC current command value Iacref becomes zero.

Circulating current calculator 604 calculates circulating current Iz flowing through one leg circuit 4, based on arm current Iarmp of the upper arm and arm current Iarmp of the lower arm. Circulating current is current circulating between a plurality of leg circuits 4. For example, circulating current Iz flowing through one leg circuit 4 can be calculated by the following equations (1) and (2).

$$Idc=(Ipu+Ipv+Ipw+Inu+Inv+Inw)/2 \quad (1)$$

$$Iz=(Iarmp+Iarmn)/2-Idc/3 \quad (2)$$

Voltage macro controller 610 generates a circulating current command value Izref so as to compensate for deficiency and excess of stored energy in all of converter cells 7 in power converter 2 and imbalance of stored energy between groups (between phase leg circuits or between arms), based on voltage evaluation value Vcg generated by voltage evaluation value generator 700.

For example, voltage macro controller 610 includes subtractors 611 and 613, an all voltage controller 612, an inter-group voltage controller 614, and an adder 615.

Subtractor 611 subtracts all voltage evaluation value Vcgall generated by voltage evaluation value generator 700 from all voltage command value Vc*. All voltage command value Vc* is a reference value of capacitor voltage Vc corresponding to a reference value of stored energy in capacitor 32 in each converter cell 7. All voltage controller 612 performs computation on the deviation of all voltage evaluation value Vcgall from all voltage command value Vc* calculated by subtracter 611 to generate a first current command value Izref1. First current command value Izref1 corresponds to a circulating current value for eliminating deficiency and excess of stored energy in all of converter cells 7 in power converter 2 by controlling the entire level of capacitor voltages Vc of converter cells 7 to all voltage command value Vc*.

Similarly, subtractor 613 subtracts group voltage evaluation value Vcgr from all voltage evaluation value Vcgall. For example, when basic controller 502 is U-phase basic controller 502, U-phase voltage evaluation value Vcgu is input as group voltage evaluation value Vcgr to subtractor 613. Inter-group voltage controller 614 performs computation on the deviation of group voltage evaluation value Vcgr (U-phase voltage evaluation value Vcgu) from all voltage evaluation value Vcgall calculated by subtracter 613 to generate a second current command value Izref2. Second current command value Izref2 corresponds to a circulating current value for eliminating imbalance of stored energy in converter cells 7 between groups by equalizing the level of capacitor voltages Vc of converter cells 7 between groups (here, between leg circuits of individual phases).

For example, all voltage controller 612 and inter-group voltage controller 614 may be configured as PI controllers that perform proportional computation and integral computation for the deviation calculated by subtractors 611 and 613 or may be configured as a PID controller that additionally performs differential computation. Alternatively, all voltage controller 612 and inter-group voltage controller 614 may be configured using a configuration of another controller commonly used in feedback control.

Adder 615 adds first current command value Izref1 from all voltage controller 612 to second current command value Izref2 from inter-group voltage controller 614 to generate circulating current command value Izref.

Circulating current controller 605 calculates a circulation control command value Vzp to perform control such that circulating current Iz calculated by circulating current calculator 604 follows circulating current command value Izref set by voltage macro controller 610. Circulating current controller 605 can also be configured with a controller that performs PI control or PID control for the deviation of circulating current Iz from circulating current command value Izref. That is, voltage macro controller 610 using voltage evaluation value Vcg forms a minor loop to control circulating current to suppress deficiency and excess of stored energy in all of converter cells 7 or a plurality of converter cells 7 in each group.

Command distributor 606 receives AC control command value Vcp, circulation control command value Vzp, DC voltage command value Vdcref, neutral point voltage Vsn, and AC voltage Vac. Since the AC side of power converter 2 is connected to AC circuit 12 through transformer 13, neutral point voltage Vsn can be determined from the voltage of DC power source of DC circuit 14. DC voltage command value Vdcref may be given by DC output control or may be a constant value.

Command distributor 606 calculates voltage shares output by the upper arm and the lower arm, based on these inputs. Command distributor 606 determines arm voltage command value krefp of the upper arm and arm voltage command value krefn of the lower arm by subtracting a voltage drop due to an inductance component in the upper arm or the lower arm from the calculated voltage.

The determined arm voltage command value krefp of the upper arm and arm voltage command value krefn of the lower arm serve as output voltage commands to allow AC current Iac to follow AC current command value Iacref, allow circulating current Iz to follow circulating current command value Izref, allow DC voltage Vdc to follow DC voltage command value Vdcref, and perform feed forward control of AC voltage Vac. In this way, circulation control command value Vzp for allowing circulating current Iz to follow circulating current command value Izref is reflected in arm voltage command values krefp and krefn. That is, circulating current command value Izref calculated by voltage macro controller 610 or circulation control command value Vzp corresponds to an embodiment of "control value" set in common to Ncell converter cells 7 included in the same arm.

Basic controller 502 outputs arm current Iarmp of the upper arm, arm current Iarmn of the lower arm, arm voltage command value krefp of the upper arm, and arm voltage command value krefn of the lower arm.

Figure 6:
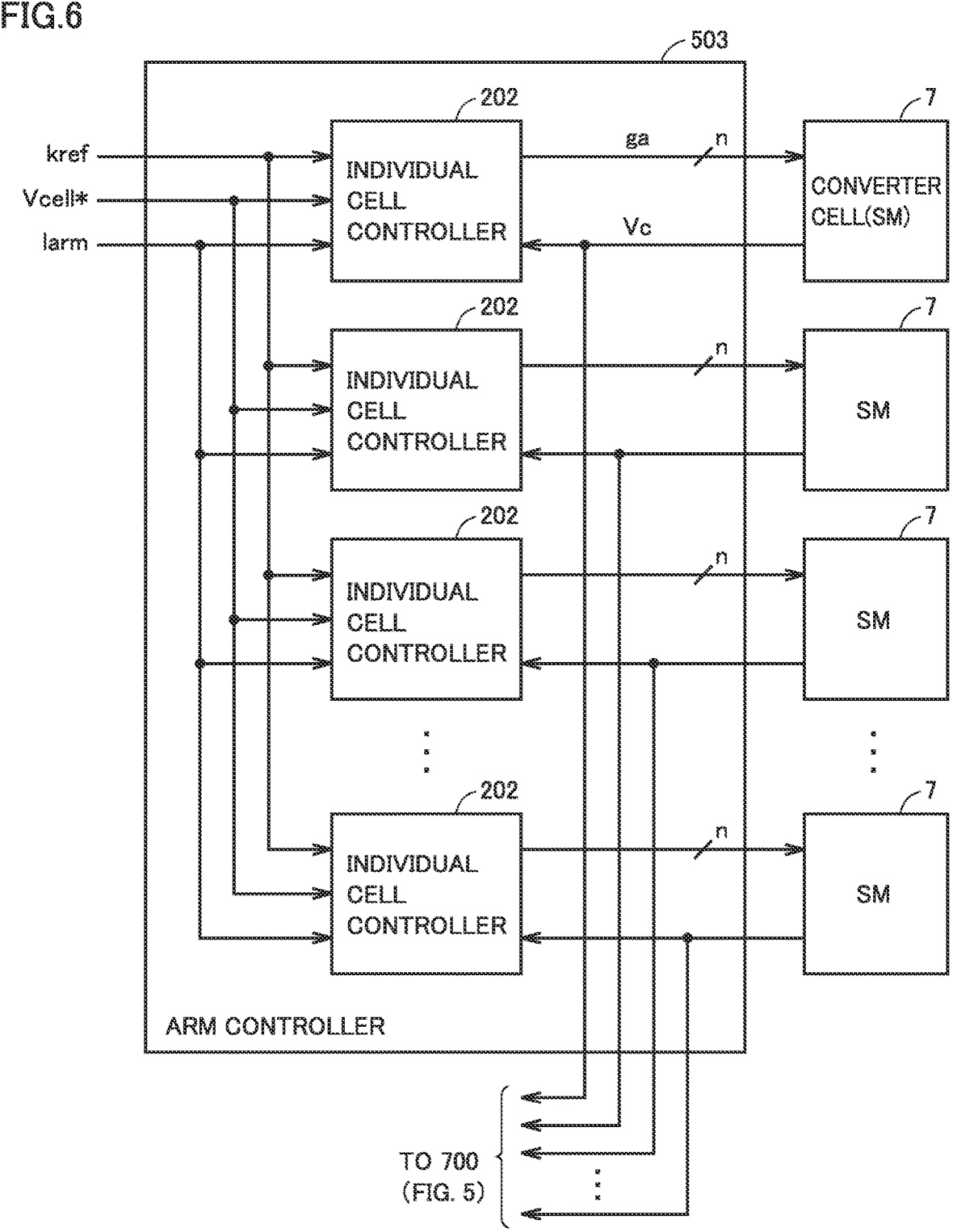
FIG. 6 is a block diagram showing a configuration example of an arm controller shown in FIG. 3.

FIG. 6 is a block diagram illustrating a configuration example of arm controller 503.

Referring to FIG. 6, arm controller 503 includes Ncell individual cell controllers 202.

Each of individual cell controllers 202 individually controls the corresponding converter cell 7. Individual cell controller 202 receives arm voltage command value kref, arm current Iarm, and capacitor command voltage value Vcref from basic controller 502.

Individual cell controller 202 generates a gate signal ga for the corresponding converter cell 7 and outputs the generated gate signal ga to the corresponding converter cell 7. Gate signal ga is a signal controlling ON and OFF of switching elements 31p and 31n in converter cell 7 in FIG. 2(a) (n=2). When converter cell 7 has the full bridge configuration in FIG. 2(b), the respective gate signals of switching elements 31p1, 31n1, 31p2, and 31n2 are generated (n=4). On the other hand, the detection value (capacitor voltage Vc) from voltage detector 33 in each converter cell 7 is sent to voltage evaluation value generator 700 shown in FIG. 5.

Figure 7:
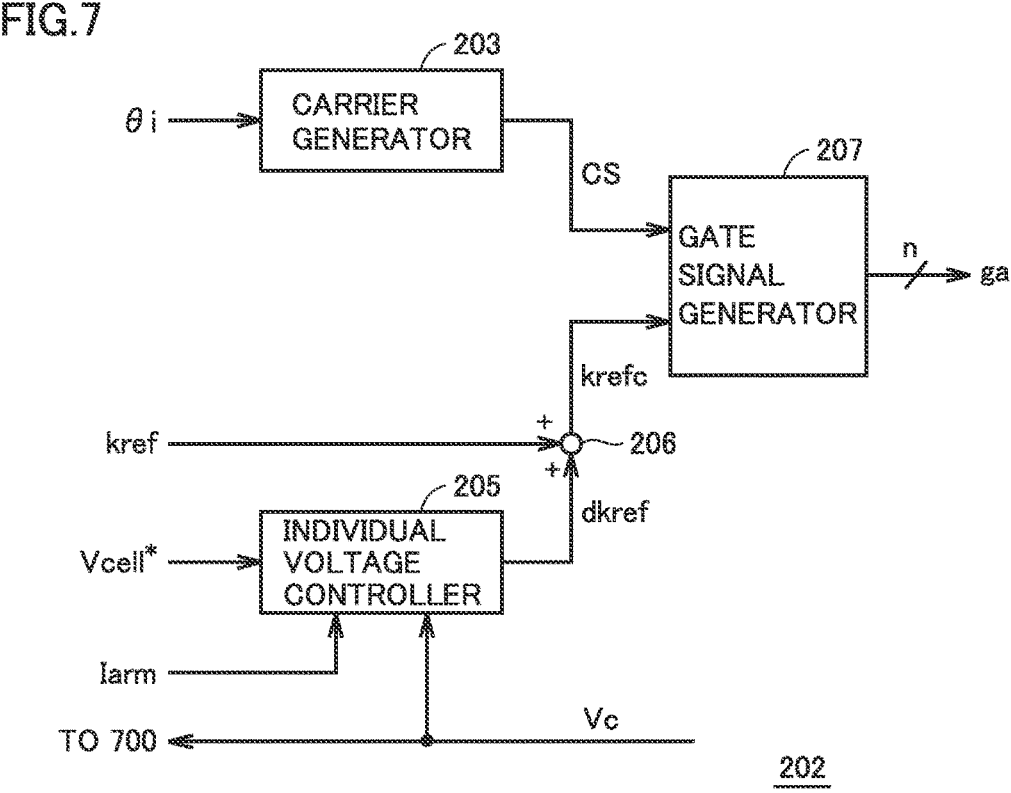
FIG. 7 is a block diagram showing a configuration example of an individual cell controller shown in FIG. 6.

FIG. 7 is a block diagram showing a configuration example of individual cell controller 202 shown in FIG. 6.

Referring to FIG. 7, individual cell controller 202 includes a carrier generator 203, an individual voltage controller 205, an adder 206, and a gate signal generator 207.

Carrier generator 203 generates a carrier signal CS having a predetermined frequency for use in phase shift pulse width modulation (PWM) control. The phase shift PWM control shifts the timings of PWM signals from each other to be output to a plurality of (Ncell) converter cells 7 that constitute the same arm (upper arm 5 or lower arm 6).

It is known that this can reduce harmonic components included in a synthesized voltage of output voltages of converter cells 7. For example, carrier generator 203 generates carrier signal CS having a phase shifted between Ncell converter cells 7, based on a common reference phase θi received from arm controller 503.

Individual voltage controller 205 receives voltage command value Vcell*, capacitor voltage Vc of the corresponding converter cell 7, and arm current of the arm to which the corresponding converter cell 7 belongs. Voltage command value Vcell* can be set to a value (fixed value) common to voltage command value Vc* of all voltage controller 612 in FIG. 5. Alternatively, in order to equalize capacitor voltage Vc in the same arm, voltage command value Vcell* may be set to the mean value of capacitor voltages of Ncell converter cells 7 included in the same arm.

Individual voltage controller 205 performs computation on the deviation of capacitor voltage Vc from voltage command value Vcell* to calculate a control output dkrefc for individual voltage control. Individual voltage controller 205 can also be configured with a controller that performs PI control or PID control. Furthermore, control output dkrefc for charging and discharging capacitor 32 in a direction that eliminates the deviation is calculated by multiplying the computed value by the controller by "+1" or "−1" in accordance with the polarity of arm current Iarm.

Adder 206 adds arm voltage command value kref from basic controller 502 to control output dkref of individual voltage controller 205 and outputs a cell voltage command value krefc.

Gate signal generator 207 generates gate signal ga by performing PWM modulation of cell voltage command value krefc by carrier signal CS from carrier generator 203.

Figure 8:
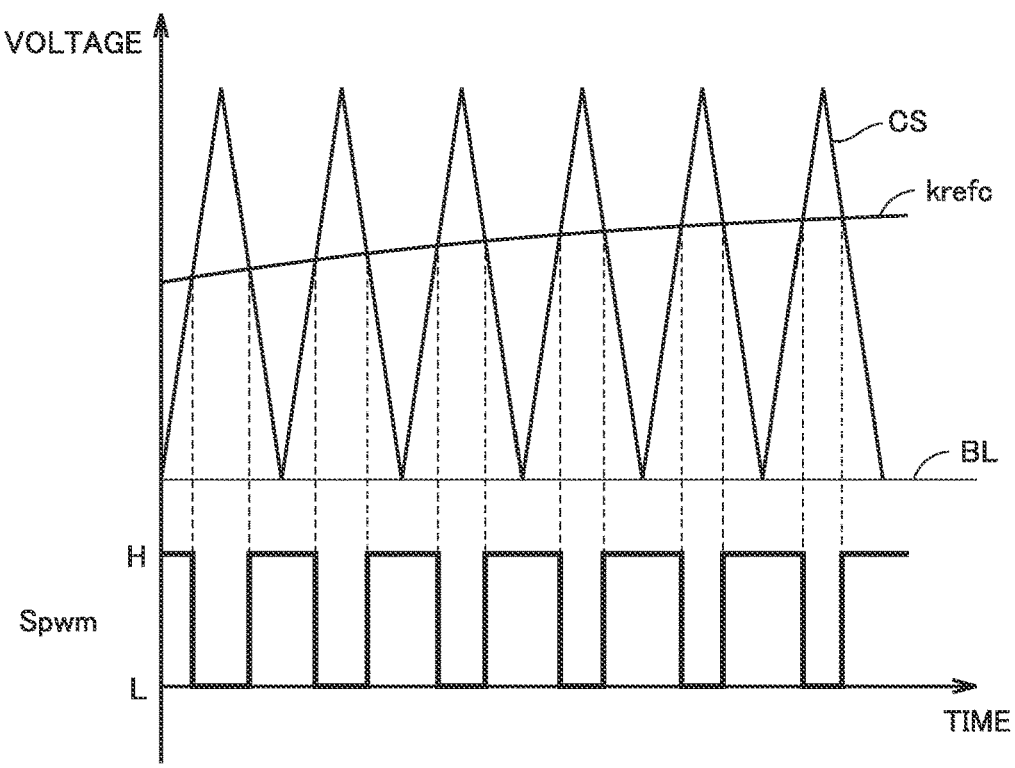
FIG. 8 is a conceptual waveform diagram for explaining PWM modulation by a gate signal generator shown in in FIG. 7.

FIG. 8 is a conceptual waveform diagram for explaining PWM modulation control by the gate signal generator shown in in FIG. 7. The signal waveforms shown in FIG. 8 are exaggerated for explanation and do not illustrate actual signal waveforms as they are.

Referring to FIG. 8, cell voltage command value krefc is compared in voltage with carrier signal CS typically formed with triangular waves. When the voltage of cell voltage command value krefc is higher than the voltage of carrier signal CS, a PWM modulation signal Spwm is set to high level (H level). Conversely, when the voltage of carrier signal CS is higher than the voltage of cell voltage command value krefc, PWM modulation signal Spwm is set to low level (L level).

For example, in the H level period of PWM modulation signal Spwm, gate signal ga (n=2) is generated such that switching element 31p is turned ON and switching element 31n is turned OFF in converter cell 7 in FIG. 2(a). Conversely, in the L level period of PWM modulation signal Spwm, gate signal ga (n=2) is generated such that switching element 31n is turned ON and switching element 31p is turned OFF.

Gate signal ga is sent to a gate driver (not shown) of switching element 31p, 31n in converter cell 7, whereby ON and OFF of switching elements 31p and 31n in converter cell 7 is controlled.

Cell voltage command value krefc corresponds to a sinusoidal voltage corrected by control output dkref. In control device 3, therefore, a modulation ratio command value in PWM modulation can be calculated by a known method from the amplitude (or the effective value) of the sinusoidal voltage (arm voltage command value kref) and the amplitude of carrier signal CS.

(Configuration Example of Voltage Evaluation Value Generator)

In this way, it is understood that in the power conversion device according to the present embodiment, capacitor voltage Vc of converter cell 7 is controlled in multiple levels including individual control (individual voltage controller 205) for each converter cell 7 and macro control (voltage macro controller 610) for controlling the stored energy in the entire power converter 2 or a plurality of converter cells 7 in the same group (each phase leg circuit or arm).

A configuration example according to the first embodiment of voltage evaluation value generator 700 (FIG. 5) that calculates voltage evaluation value Vcg for use in macro control, which is a feature of the power converter in the present embodiment, will be explained below.

FIG. 9 to FIG. 15 are block diagrams illustrating first to seventh configuration examples of the voltage evaluation value generator according to the first embodiment.

Figure 9:
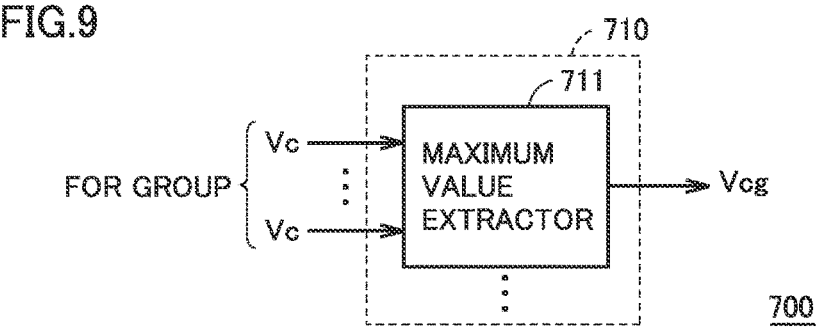
FIG. 9 is a block diagram illustrating a first configuration example of a voltage evaluator according to a first embodiment.

Referring to FIG. 9, in the first configuration example in the first embodiment, voltage evaluation value generator 700 includes at least one evaluation value calculator 710 configured with a maximum value extractor 711.

The detection values of capacitor voltages Vc by voltage detectors 33 are input to maximum value extractor 711 from a plurality of (2×Ncell or Ncell) converter cells 7 included in a predetermined group, for example, the same leg circuit 4 or the same arm (upper arm 5 or lower arm 6 in each phase). Maximum value extractor 711 extracts the maximum value of a plurality of the input capacitor voltages Vc, and voltage evaluation value generator 700 outputs the maximum value extracted by maximum value extractor 711 as voltage evaluation value Vcg.

For example, when voltage evaluation value generator 700 outputs U-phase voltage evaluation value Vcgu, V-phase voltage evaluation value Vcgv, and V-phase voltage evaluation value Vcgv as voltage evaluation value Vcg, (2×Ncell) capacitor voltages Vc are input to maximum value extractor 711 corresponding to each of the U phase, the V phase, and the W phase from a plurality of converter cells 7 included in one of leg circuits 4u (U phase), 4v (V phase), and 4w (W phase). As a result, the maximum value of (2×Ncell) capacitor voltages Vc extracted by maximum value extractor 711 corresponding to each phase is output from voltage evaluation value generator 700 as U-phase voltage evaluation value Vcgu, V-phase voltage evaluation value Vcgv, and V-phase voltage evaluation value Vcgv.

When voltage evaluation value generator 700 generates a voltage evaluation value for each arm (upper arm 5 or lower arm 6) of each phase as voltage evaluation value Vcg, Ncell capacitor voltages Vc are input to maximum value extractor 711 corresponding to each of upper arm 5 and lower arm 6 of each phase from a plurality of converter cells 7 included in the upper arm 5 or lower arm 6. In this case, the maximum value of Ncell capacitor voltages Vc extracted by (3×2) maximum value extractors 711 is output as the respective voltage evaluation values of a total of six arms.

Alternatively, the maximum value of capacitor voltages Vc (3×2×Ncell) of all of converter cells 7 that constitute power converter 2 may be output as all voltage evaluation value Vcgall.

Figure 10:
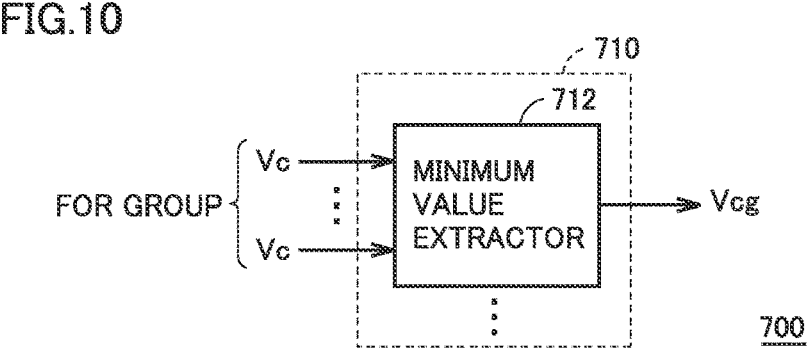
FIG. 10 is a block diagram illustrating a second configuration example of the voltage evaluator according to the first embodiment.

Referring to FIG. 10, in the second configuration example in the first embodiment, voltage evaluation value generator 700 includes at least one evaluation value calculator 710 configured with at least one minimum value extractor 712. A plurality of capacitor voltages Vc similar to those in maximum value extractor 711 in FIG. 9 are input to minimum value extractor 712. Minimum value extractor 712 extracts the minimum value of a plurality of input capacitor voltages Vc, and voltage evaluation value generator 700 outputs the minimum value extracted by minimum value extractor 712 as voltage evaluation value Vcg.

According to the second configuration example, voltage macro controller 610 operates such that the minimum value of capacitor voltages Vc in each group is controlled to be balanced between groups or the minimum value of capacitor voltages Vc in all of converter cells 7 is controlled to all voltage command value Vc*. Therefore, the control of enhancing the protection effect against excessive decrease of capacitor voltage Vc can be realized.

Figure 11:
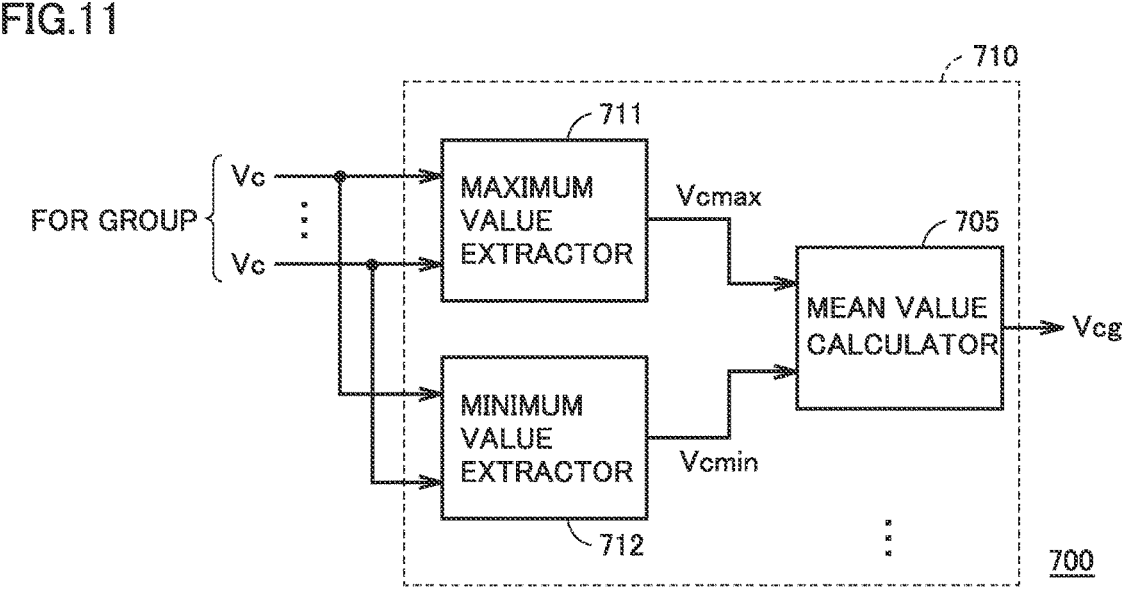
FIG. 11 is a block diagram illustrating a third configuration example of the voltage evaluator according to the first embodiment.

Referring to FIG. 11, in the third configuration example in the first embodiment, voltage evaluation value generator 700 includes at least one evaluation value calculator 710 configured with maximum value extractor 711, minimum value extractor 712, and a mean value calculator 713.

The input/output of maximum value extractor 711 and the input/output of minimum value extractor 712 are similar to those in FIG. 9 and FIG. 10. Mean value calculator 713 outputs the mean value ((Vcmax+Vcmin)/2) of Vcmax output from maximum value extractor 711 and Vcmin output from minimum value extractor 712.

Voltage evaluation value generator 700 outputs the mean value of the maximum value and the minimum value calculated by mean value calculator 713 as voltage evaluation value Vcg. The thus calculated voltage evaluation value Vcg reflects the maximum value and the minimum value with a high weight, compared with a simple mean value of capacitor voltages Vc. Furthermore, compared with the first and second configuration examples, averaging the maximum value and the minimum value enables information on variations and average of capacitor voltages Vc to be reflected in voltage evaluation value Vcg.

According to the third configuration example, it can be expected that the average and variations of capacitor voltages Vc is controlled by voltage macro controller 610 and the protection effect against excessive increase and excessive decrease is enhanced.

Figure 12:
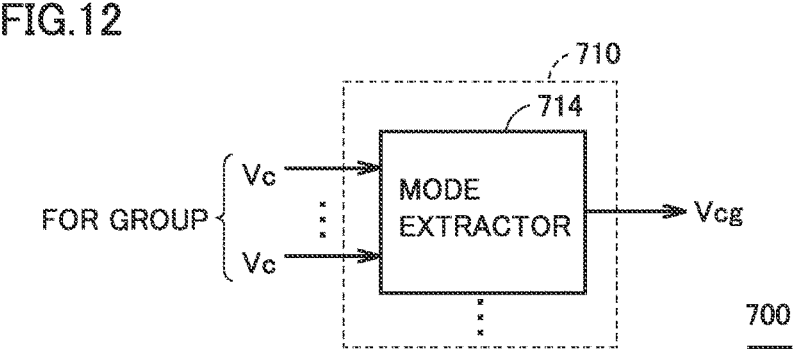
FIG. 12 is a block diagram illustrating a fourth configuration example of the voltage evaluator according to the first embodiment.

Referring to FIG. 12, in the fourth configuration example in the first embodiment, voltage evaluation value generator 700 includes at least one evaluation value calculator 710 configured with at least one mode extractor 714. A plurality of capacitor voltages Vc similar to those in maximum value extractor 711 in FIG. 9 and minimum value extractor 712 in FIG. 10 are input to mode extractor 714. Mode extractor 714 extracts the mode of a plurality of input capacitor voltages Vc.

For example, a plurality of capacitor voltages are classified into a plurality of predetermined voltage regions, and the central value of a voltage region in which the largest number of capacitor voltages Vc are classified is extracted as the mode. Voltage evaluation value generator 700 outputs the mode extracted by mode extractor 714 as voltage evaluation value Vcg.

According to the fourth configuration example, voltage macro controller 610 operates such that the mode of capacitor voltages Vc in the same group is controlled to be balanced between groups or the mode of capacitor voltages Vc in all of converter cells 7 is controlled to all voltage command value Vc*. Therefore, in consideration of a distribution of capacitor voltages Vc, deficiency and excess or imbalance with respect to the average level of stored energy can be eliminated appropriately.

Figure 13:
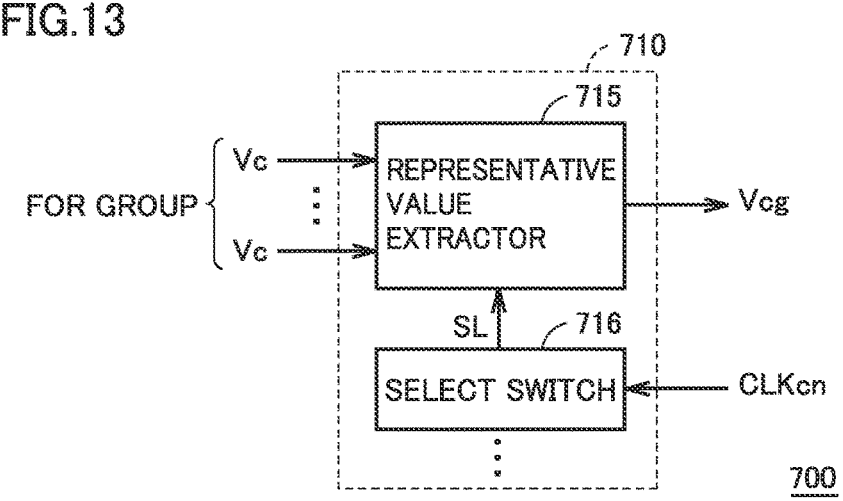
FIG. 13 is a block diagram illustrating a fifth configuration example of the voltage evaluator according to the first embodiment.

Referring to FIG. 13, in the fifth configuration example in the first embodiment, voltage evaluation value generator 700 includes at least one evaluation value calculator 710 configured with a representative value extractor 715 and a select switch 716.

A plurality of capacitor voltages Vc similar to those in maximum value extractor 711 in FIG. 9 and minimum value extractor 712 in FIG. 10 are input to representative value extractor 715. Select switch 716 generates a select signal SL for selecting one of the number of (here, N) capacitor voltages Vc input to representative value extractor 715. Select switch 716 switches select signal SL every cycle or every multiple cycles of clock CLKcn having a certain frequency.

For example, select switch 716 can generate select signal SL based on a random number output from a random number generator (not shown). Alternatively, select switch 716 may generate select signal SL such that Ncell converter cells 7 are selected sequentially using a count value counted up in accordance with clock CLKn.

Representative value extractor 715 extracts one capacitor voltage Vc from Ncell input capacitor voltages Vc in accordance with select signal SL from select switch 716. Voltage evaluation value generator 700 outputs, as voltage evaluation value Vcg, the representative value of capacitor voltages Vc extracted at random in accordance with a random number or extracted sequentially in accordance with a count value by representative value extractor 715.

According to the fifth configuration example, since the capacitor voltage Vc extracted in accordance with a random number or a count value as voltage evaluation value Vcg, the computation load in generating voltage evaluation value Vcg is reduced. Furthermore, the representative value extracted at random or extracted sequentially is set as voltage evaluation value Vcg, whereby the control by voltage macro controller 610 that reflects average and variations of capacitor voltage Vc can be realized.

Figure 14:
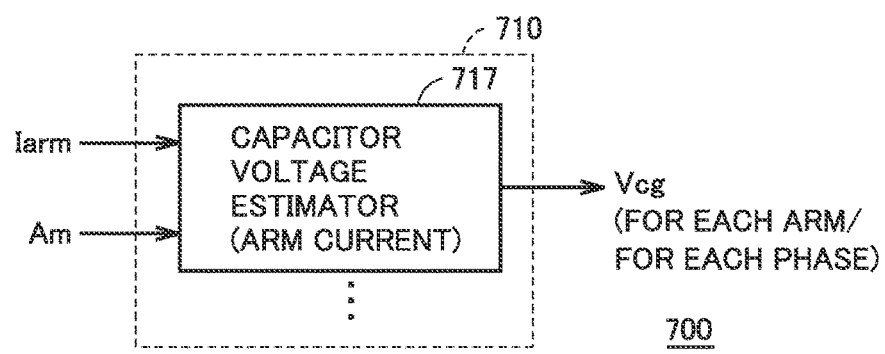
FIG. 14 is a block diagram illustrating a sixth configuration example of the voltage evaluator according to the first embodiment.

Referring to FIG. 14, in the sixth configuration example in the first embodiment, voltage evaluation value generator 700 includes at least one evaluation value calculator 710 configured with a capacitor voltage estimator 717. For example, capacitor voltage estimator 717 is arranged corresponding to each of upper arm 5 and lower arm 6 of each phase. Capacitor voltage estimator 717 corresponds to an embodiment of "first voltage estimator".

Here, capacitor voltage estimator 717 calculates an estimation value of capacitor voltage Vc of one arm, based on arm current Iarm and modulation ratio command value Am. As described above, arm current Iarm (Iarmp, Iarmn) of upper arm 5 and lower arm 6 of each phase is detected by arm current detectors 9A and 9B. Furthermore, as described above, modulation ratio command value Am in PWM modulation can be calculated for arm voltage command value kref (sinusoidal voltage) in each arm. For example, in converter cell 7 in the half bridge configuration in FIG. 2(a), modulation ratio command value Am is in the range of 0 to 1.0.

The amount of charge input and output to Ncell converter cells 7 can be estimated by integrating the multiplication value of arm current Iarm and modulation ratio command value Am over time in each arm.

Therefore, capacitor voltage Vc in units of arm can be estimated according to equation (3) below. Csm in equation (1) is the capacitance (nominal value) of each capacitor 32, and Carm means the total sum of capacitance values of capacitors 32 in converter cells 7 of one arm.

$$Vcg=(1/Carm)\times\int(Am\times Iarm)dt \qquad (3)$$

where Carm=Csm×Ncell.

The estimation value of capacitor voltage Vc of each phase (leg circuit 4) can also be obtained by averaging the capacitor voltage estimation values of upper arm 5 and lower arm 6 according to equation (1).

According to the sixth configuration example, voltage evaluation value Vcg (group voltage evaluation value Vcgr) in each arm or each phase that reflects change in stored energy can be obtained from the behavior of charge/discharge current of capacitor 32, earlier than the detection value of capacitor voltage Vc is changed by charge/discharge of capacitor 32. As a result, the operation of voltage macro controller 610 based on the voltage evaluation value Vcg can promptly eliminate imbalance of stored energy between groups (between phase leg circuits or between arms).

Figure 15:
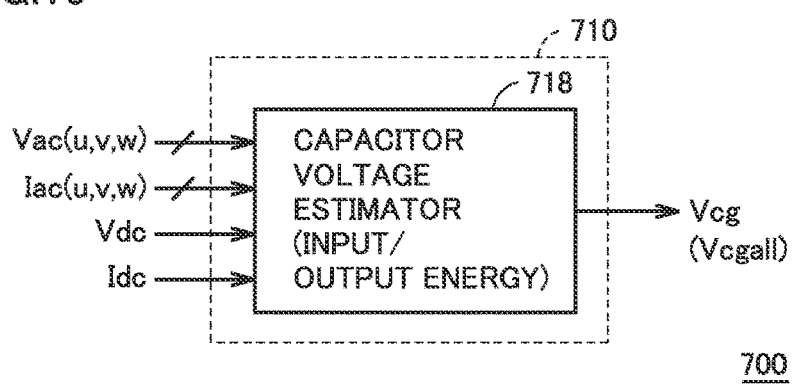
FIG. 15 is a block diagram illustrating a seventh configuration example of the voltage evaluator according to the first embodiment.

Referring to FIG. 15, in the seventh configuration example in the first embodiment, voltage evaluation value generator 700 includes evaluation value calculator 710 configured with a capacitor voltage estimator 718. Capacitor voltage estimator 718 calculates all voltage evaluation value Vcgall of voltage evaluation values Vcg. Capacitor voltage estimator 718 corresponds to an embodiment of "second voltage estimator".

Capacitor voltage estimator 718 determines a total input/output power Pt in the entire power converter 2 that is the total sum of instantaneous powers input and output between power converter 2 and an external circuit (for example, AC circuit 12 and DC circuit 14 in FIG. 1).

In each of AC input terminals Nu, Nv, and Nw, instantaneous power Pac input and output to/from AC circuit 12 can be calculated at each point of time from the detection value of AC current Iacu, Iacv, Iacw by AC current detector 16 and the detection value of AC voltage Vacu, Vacv, Vacw by AC voltage detection value. Similarly, at high potential-side DC terminal Np and low potential-side DC terminal Nn, instantaneous power Pdc input and output to/from DC circuit 14 can be calculated at each point of time from the detection value of Vdc=(Vdcp−Vdcn) by DC voltage detectors 11A and 11B and the detection value of DC current Idc by DC voltage detector 17. DC voltage (Vdc) can also be calculated by the total sum of capacitor voltages Vc (detection values) of a plurality of converter cells 7 included in upper arm 5 and lower arm 6. The total input/output power Pt described above can be obtained in accordance with the sum of instantaneous powers Pac and Pdc.

Furthermore, capacitor voltage Vc in one converter cell 7 can be calculated in accordance with the following equation (4) by estimating change in total sum of stored energy of converter cells 7 (capacitors 32) in the entire power converter 2 using the time-integral value of the total input/output power Pt.

$$Vcg=(1/Ct)\times(1/Vsm)\times\int Pt\,dt \qquad (4)$$

In equation (4), Ct means the total sum of capacitance values of capacitors 32 in converter cells 7 in the entire power converter 2 and is given by Ct=3×2×Ncell×Csm. Vsm means the nominal value of voltage of each capacitor 32.

According to the seventh configuration example, all voltage evaluation value Vcgall of voltage evaluation values Vcg that reflects change in stored energy can be obtained from the behavior of charge/discharge current of capacitor 32, earlier than the detection value of capacitor voltage Vc is changed by charge/discharge of capacitor 32. As a result, the operation of voltage macro controller 610 based on the voltage evaluation value Vcg can promptly eliminate imbalance of stored energy between groups (between phase leg circuits or between arms).

In the sixth configuration example (FIG. 14) and the seventh configuration example (FIG. 15), voltage evaluation value Vcg can be obtained without using the detection value of capacitor voltage Vc.

Modification to First Embodiment

Figure 16:
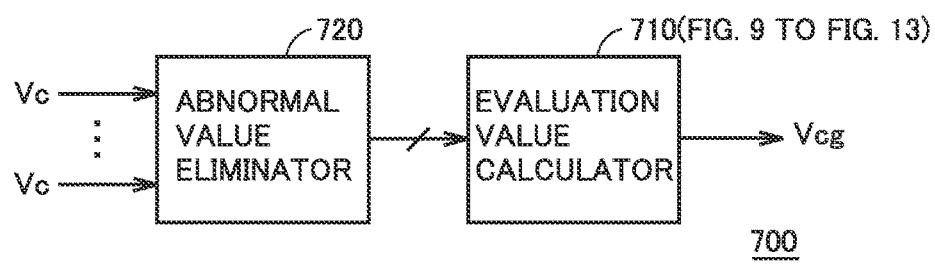
FIG. 16 is a block diagram illustrating a configuration example of the voltage evaluator according to a modification to the first embodiment.

FIG. 16 is a block diagram illustrating a configuration example of the voltage evaluator according to a modification to the first embodiment.

Referring to FIG. 16, voltage evaluation value generator 700 according to a modification of the first embodiment includes an abnormal value eliminator 720 and an evaluation value calculator 710. Evaluation value calculator 710 is similar to any one of the first to fifth configuration examples illustrated in FIG. 9 to FIG. 13. A plurality of capacitor voltages Vc similar to those input to maximum value extractor 711, minimum value extractor 712, mode extractor 714, and representative value extractor 715 in FIG. 9 to FIG. 13 are input to abnormal value eliminator 720.

Abnormal value eliminator 720 eliminates those of Vc<Vchkmin and Vc>Vchkmax as abnormal values from a plurality of input capacitor voltages Vc.

The relation Vuv<Vchk<<Vc*(Vsm)<<Vchkmax<Vov holds between a determination voltage Vov for overvoltage (OV) protection and a determination voltage Vuv for undervoltage (UV) protection for capacitor voltage Vc, and determination voltages Vchkmin and Vchkmax in abnormal value eliminator 720.

Abnormal value eliminator 720 inputs the remaining capacitor voltages Vc after removal of abnormal values to at least one of maximum value extractor 711, minimum value extractor 712, mode extractor 714, and representative value extractor 715. After these capacitor voltages Vc are input, the operation of maximum value extractor 711, minimum value extractor 712, mode extractor 714, and representative value extractor 715 is similar to that in the first embodiment and a detailed description is not repeated.

In this way, according to the modification to the first embodiment, voltage evaluation value Vcg is calculated based on capacitor voltages Vc from which abnormal values are removed, whereby the performance of the above control by voltage macro controller 610 can be enhanced.

Second Embodiment

Figure 17:
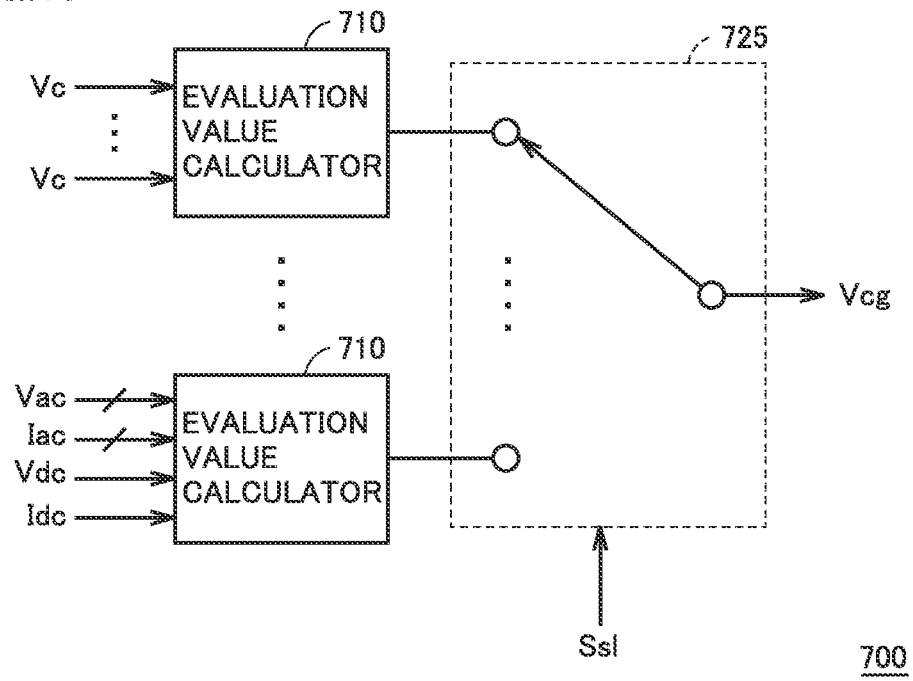
FIG. 17 is a block diagram illustrating a configuration example of the voltage evaluator according to a second embodiment.

FIG. 17 is a block diagram illustrating a configuration example of the voltage evaluator according to a second embodiment.

Referring to FIG. 17, voltage evaluation value generator 700 according to the second embodiment includes a plurality of evaluation value calculators 710 and an output selector 725.

At least some of evaluation value calculators 710 illustrated in FIG. 9 to FIG. 15 are applied to a plurality of evaluation value calculators 710. Abnormal value eliminator 720 shown in FIG. 16 may be further arranged on the input side of a plurality of evaluation value calculators 710.

Output selector 725 selects one output value from among a plurality of output values from a plurality of evaluation value calculators 710, in accordance with a select signal Ssl set in accordance with the operating condition of power converter 2. Voltage evaluation value generator 700 outputs an output value selected by output selector 725 to voltage macro controller 610 as voltage evaluation value Vcg.

For example, select signal Ssl can be changed in accordance with a voltage detection state by voltage detectors 33. As an example, when capacitor voltages Vc are detected by all of voltage detectors 33, the output value of evaluation value calculator 710 in accordance with extraction of at least one of the maximum value and the minimum value shown in FIG. 9 to FIG. 12 is selected, whereas when abnormality occurs in voltage detection by any one of voltage detectors 33, the output value of any one of evaluation value calculators 710 according to the fourth to seventh configuration examples shown in FIG. 13 to FIG. 15 can be selected instead.

When the detection values by voltage detectors 33 include many abnormal values (for example, when the number of removals by abnormal value eliminator 720 is greater than a predetermined value), the output value of one of evaluation value calculators 710 according to the sixth and seventh configuration examples shown in FIG. 14 and FIG. 15, which does not use the detection values of capacitor voltages Vc, can be selected.

In this way, according to the second embodiment, voltage evaluation value Vcg for use in voltage macro controller 610 can be generated appropriately, based on the operating condition of power converter 2 (for example, whether voltage detector 33 is abnormal or normal in each converter cell 7 or a distribution condition of capacitor voltages Vc).

Third Embodiment

Figure 18:
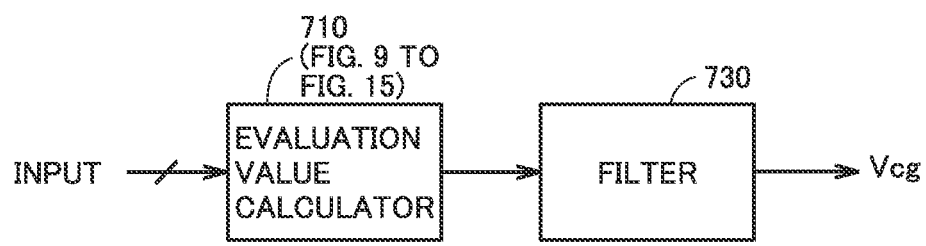
FIG. 18 is a block diagram illustrating a configuration example of the voltage evaluator according to a third embodiment.

FIG. 18 is a block diagram illustrating a first configuration example of the voltage evaluator according to a third embodiment.

Referring to FIG. 18, voltage evaluation value generator 700 according to the third embodiment includes an evaluation value calculator 710 and a filter 730. Evaluation value calculator 710 is similar to any one of the first to seventh configuration examples shown in FIG. 9 to FIG. 15. Abnormal value eliminator 720 shown in FIG. 16 may be further arranged on the input side of evaluation value calculator 710.

Filter 730 is designed to have predetermined characteristics. For example, filter 730 is configured to have the characteristic of averaging the successively generated output values of evaluation value calculator 710 in order to remove a change in a short time. In this case, filter 730 can be formed with a lowpass filter such as first-order lag filter or a filter that calculates a moving average or an integral mean value.

Conversely, in order to extract a change in a short time, filter 730 may be configured to have the characteristic of extracting a change in output value successively output from evaluation value calculator 710. In this case, filter 730 can be formed with, for example, a low frequency cutoff (highpass) filter or a pseudo differential filter.

Voltage evaluation value generator 700 outputs the output value of evaluation value calculator 710, which has been processed by filter 730, as voltage evaluation value Vcg to voltage macro controller 610.

For example, voltage evaluation value Vcg can be generated by removing the influence of ripple of capacitor voltage Vc, with a combination of evaluation value calculator 710 according to the first to fifth configuration examples shown in FIG. 9 to FIG. 13 and filter 730 having the averaging characteristics. With this configuration, the control by voltage macro controller 610 can be stabilized.

On the other hand, voltage evaluation value Vcg that promptly reflects a change in capacitor voltage Vc due to current behavior or power behavior can be generated with a combination of evaluation value calculator 710 according to the sixth and seventh configuration examples shown in FIG. 14 and FIG. 15 and filter 730 having the characteristic of extracting a change. With this configuration, the responsiveness of control by voltage macro controller 610 can be enhanced.

Fourth Embodiment

Figure 19:
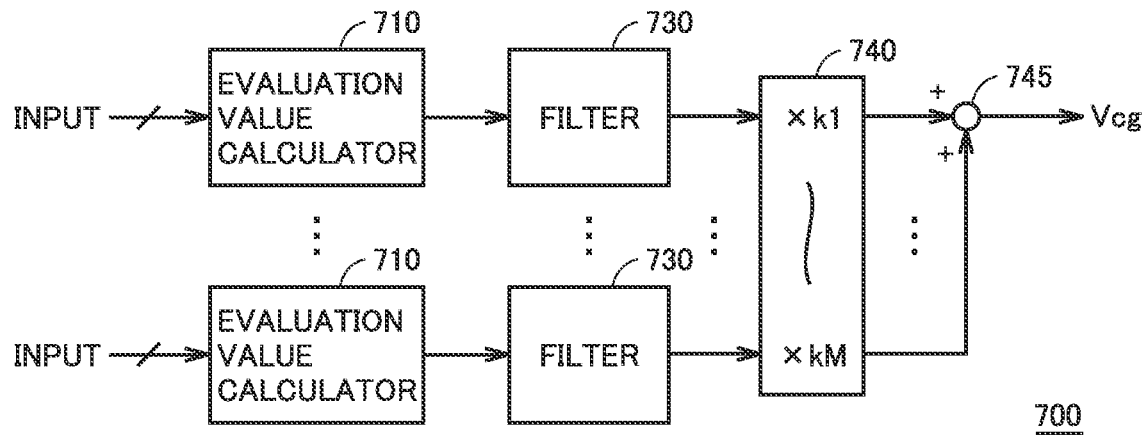
FIG. 19 is a block diagram illustrating a configuration example of the voltage evaluator according to a fourth embodiment.

FIG. 19 is a block diagram illustrating a configuration example of the voltage evaluator according to a fourth embodiment.

Referring to FIG. 19, voltage evaluation value generator 700 according to the fourth embodiment includes M (M is a natural number equal to or greater than 2) sets of evaluation value calculator 710 and filter 730 described in the third embodiment and further includes a gain multiplier 740 and an adder 745.

Each of evaluation value calculators 710 is similar to any one of the first to seventh configuration examples shown in FIG. 9 to FIG. 15 as in the third embodiment. Abnormal value eliminator 720 shown in FIG. 16 may be arranged on the input side of evaluation value calculators 710.

Filter 730 has predetermined characteristics in the same manner as in the third embodiment and allows the output value of evaluation value calculator 710 to pass through. The characteristics of a plurality of filters 730 may be different from each other or may be common among at least some of filters 730.

Gain multiplier 740 outputs multiplication values of respective output values of a plurality of (M) filters 730 by gain ki (i=1 to M). Each of gains k1 to kM is set in a range of 0 to 1.0.

Adder 745 adds M output values from gain multiplier 740. Voltage evaluation value generator 700 outputs the output value of adder 745 as voltage evaluation value Vcg to voltage macro controller 610. In particular, it can be expected that voltage evaluation value Vcg can be set appropriately by passing through filters 730 having different frequency characteristics and thereby adjusting the weight by gain ki.

Figure 20:
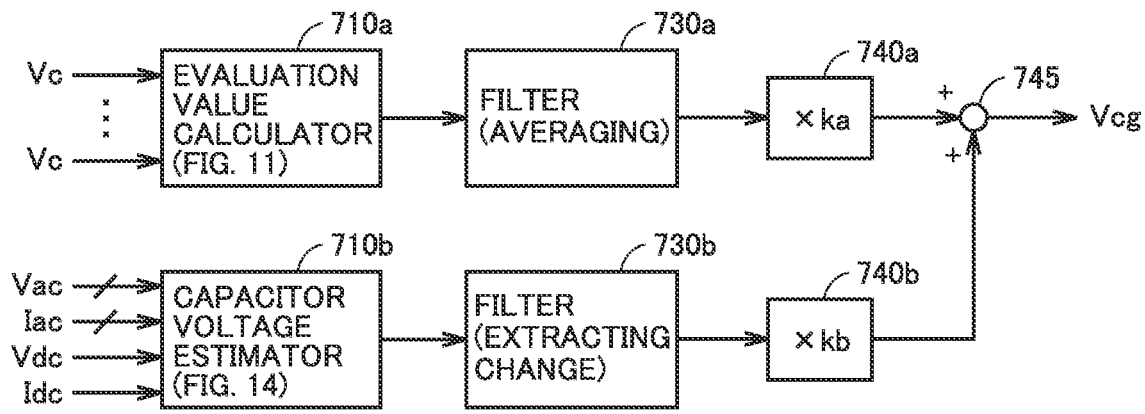
FIG. 20 is a block diagram illustrating a specific example of the voltage evaluator according to the fourth embodiment.

FIG. 20 is a block diagram illustrating a specific example of the voltage evaluator according to the fourth embodiment.

Referring to FIG. 20, voltage evaluation value generator 700 according to the fourth embodiment includes evaluation value calculator 710 shown in FIG. 11, capacitor voltage estimator 717 shown in FIG. 14, filters 730a and 730b, gain multipliers 740a and 740b, and an adder 745.

As illustrated in FIG. 11, evaluation value calculator 710 outputs (Vcmax+Vcmin)/2 in the same group (phase or arm). Similarly, capacitor voltage estimator 717 outputs a capacitor voltage estimation value estimated from arm current Iarm in the same group (phase or arm).

Filter 730a is configured to have the characteristic of averaging the successively generated output values of evaluation value calculator 710. As described above, filter 730a can be formed with, for example, a lowpass filter such as a first-order lag filter or a filter that calculates a moving average or an integral mean value.

Filter 730b is configured to have the characteristic of extracting a change in capacitor voltage estimation value successively output from capacitor voltage estimator 717. As described above, filter 730b can be formed with, for example, a low frequency cutoff (high-pass) filter or a pseudo differential filter.

Gain multiplier 740a outputs a multiplication value of an output value of filter 730a by a gain ka. Gain multiplier 740b outputs a multiplication value of an output value of filter 730b by a gain kb. Each of gains ka and kb is set in a range of 0 to 1.0.

Adder 745 adds output values of gain multipliers 740a and 740b. Voltage evaluation value generator 700 outputs the output value of adder 745 as voltage evaluation value Vcg to voltage macro controller 610.

In FIG. 20, evaluation value calculator 710 (FIG. 11) corresponds to an embodiment of "first evaluation value calculator", capacitor voltage estimator 717 corresponds to an embodiment of "second evaluation value calculator", filter 730a corresponds to an embodiment of "first filter", and filter 730b corresponds to an embodiment of "second filter". Gain ka corresponds to "first gain", and gain kb corresponds to "second gain".

In a specific example of FIG. 20, the calculation value of evaluation value calculator 710 (FIG. 11) based on detection of capacitor voltages Vc is passed through filter 730a (lowpass filter) to remove the influence of ripple voltage. On the other hand, the capacitor voltage estimation value that reflects the behavior of arm current Iarm by capacitor voltage estimator 717 is passed through filter 730b (low frequency cutoff filter) to extract a change in capacitor voltage Vc.

Furthermore, these values are added with adjustment of weight by gains ka and kb, whereby voltage evaluation value Vcg can be generated such that the influence of ripple fluctuations is suppressed and voltage change by arm current Iarm is promptly reflected. Consequently, the stability and the responsiveness of control by voltage macro controller 610 can be enhanced.

For control of stored energy in units of converter cells 7 using voltage evaluation values Vcg, FIG. 5 illustrates the control in which a control value (circulating current command value Izref or circulation control command value Vzp) in a minor loop for controlling circulating current is generated by voltage macro controller 610. However, it should be noted the control using voltage evaluation value Vcg is not limited to such an example. That is, voltage evaluation value Vcg described in the present embodiment may be set as a control target value in the control of the mean value of capacitor voltages Vc in all of converter cells 7 or a plurality of converter cells 7 in each group described above.

For example, in the first embodiment, in the control in FIG. 5, circulation control command value Vzp for controlling deficiency and excess of stored energy between converter cells 7 is reflected in arm voltage command values krefp and krefn in command distributor 606. However, the control by circulation control command value Vzp is not limited to the example in FIG. 5. For example, deficiency and excess of stored energy between converter cells 7 can also be controlled by modulation of the carrier signal used in the PWM control in each individual cell controller 202.

Figure 21:
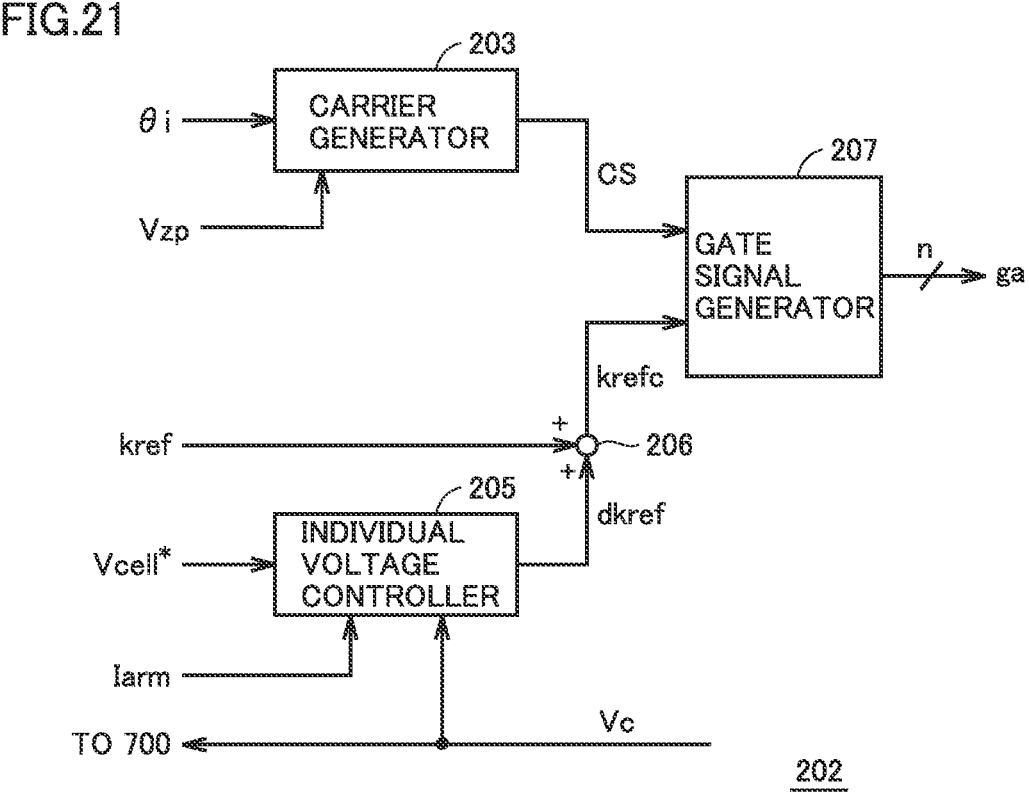
FIG. 21 is a block diagram illustrating another configuration example of the individual cell controller.

FIG. 21 is a block diagram illustrating another configuration example of the individual cell controller.

Referring to FIG. 21, individual cell controller 202 according to a modification differs from the configuration in FIG. 5 in that circulation control command value Vzp in FIG. 5 is input to carrier generator 203. On the other hand, in arm voltage command generator 601 in FIG. 5, circulation control command value Vzp is not input to command distributor 606, and command distributor 606 generates arm voltage command values krefp and krefn without reflecting circulation control command value Vzp.

As illustrated in FIG. 5, circulation control command value Vzp is generated using voltage evaluation value Vcg (all voltage evaluation value Vcgall and group voltage evaluation value Vcgr), and a common value is input to respective individual cell controllers 202 of a plurality of converter cells 7 belonging to the same group (each phase leg circuit or each arm).

In the configuration in FIG. 21, the function of individual voltage controller 205 is similar to that of FIG. 7. On the other hand, carrier generator 203 generates carrier signal CS by modulating a carrier signal for phase shift PWM control in accordance with reference phase θi, similar to that in FIG. 5, in accordance with circulation control command value Vzp. Gate signal generator 207 generates gate signal ga using PMW modulation signal Spwm in accordance with comparison between carrier signal CS from carrier generator 203 and cell voltage command value krefc, in the same manner as described in FIG. 5. In doing so, carrier signal CS is modulated in accordance with circulation control command value Vzp, so that the pulse width of PMW modulation signal Spwm (that is, gate signal ga) is controlled such that the difference between circulating current Iz and circulating current command value Izref in FIG. 5 is further reduced in accordance with circulation control command value Vzp, as illustrated in FIG. 22 and FIG. 23.

Figure 22:
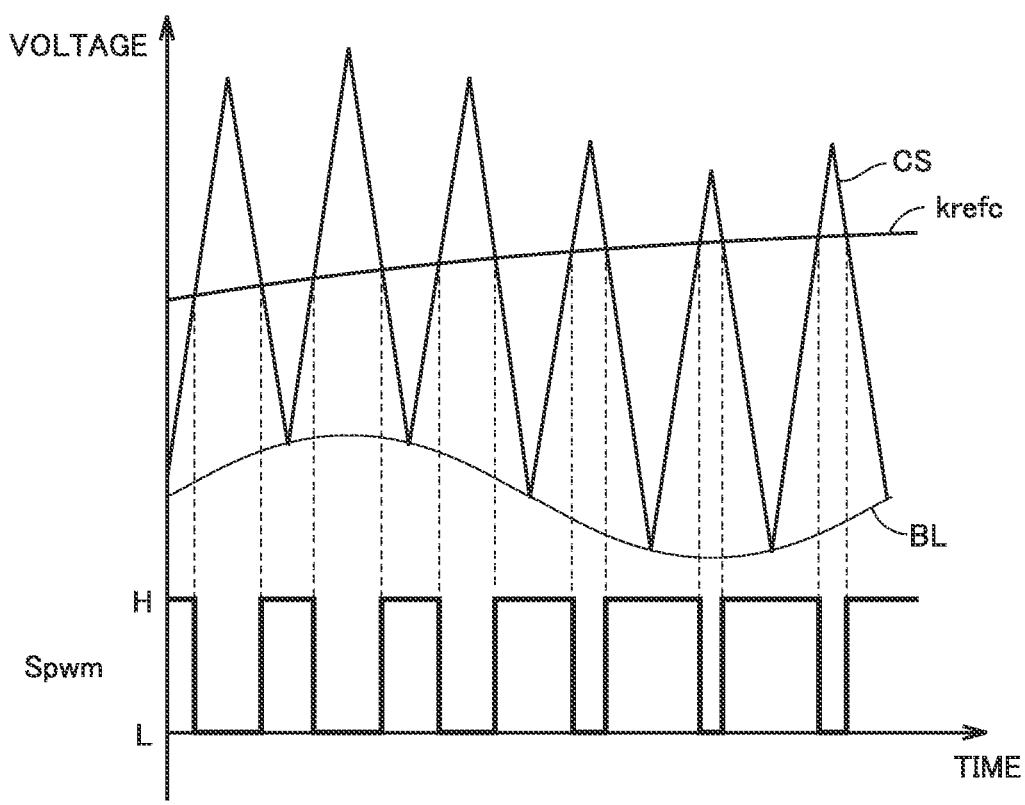
FIG. 22 is a conceptual waveform diagram illustrating a first example of carrier signal modulation.
Figure 23:
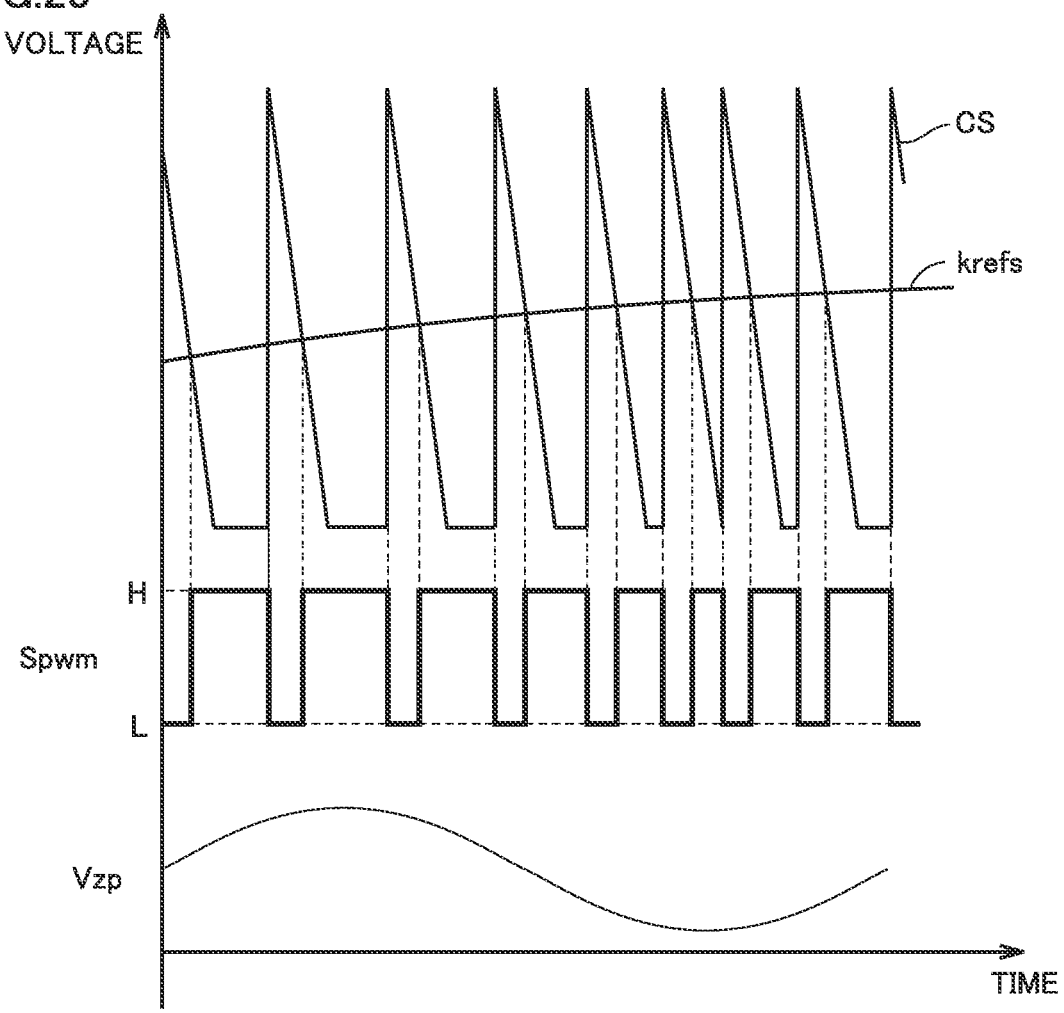
FIG. 23 is a conceptual waveform diagram illustrating a second example of carrier signal modulation.

Referring to FIG. 22 and FIG. 23, base line modulation and frequency modulation will be described as specific examples of the modulation method of the carrier signal. FIG. 22 shows a conceptual waveform diagram illustrating base line modulation as a first example of carrier signal modulation. On the other hand, FIG. 23 shows a conceptual waveform diagram illustrating frequency modulation as a second example of carrier signal modulation. The modulation method of carrier signal CS is not limited to these methods. Any modulation method that can perform control such that the pulse width of the finally generated PMW modulation signal Spwm (that is, gate signal ga) changes in accordance with a circulating voltage command value (for example, the greater the circulation control command value Vpz is, the wider the pulse width of PMW modulation signal Spwm is).

When base line modulation is not performed, as illustrated in FIG. 8, the base line BL of triangular carrier signal CS is fixed to zero. In FIG. 8, PMW modulation signal Spwm (gate signal ga) is generated by PWM modulation that compares carrier signal CS fixed to BL=0 with arm voltage command value kref.

Referring to FIG. 22, in the base line modulation, base line BL that is a reference potential of triangular carrier signal CS similar to that in FIG. 8 changes in accordance with circulation control command value Vpz. The waveform of arm voltage command value kref is the same between FIG. 8 and FIG. 22. In FIG. 22, the signal waveforms are exaggerated for explanation and do not illustrate actual signal waveforms as they are, in the same manner as in FIG. 8.

It is understood that in PMW modulation signal Spwm in FIG. 22 compared with that of FIG. 8, since base line BL changes in accordance with circulation control command value Vpz, the pulse width changes in accordance with change of base line BL. Specifically, when base line BL becomes a lower potential, the pulse width of PMW modulation signal Spwm becomes larger, whereas when base line BL becomes a higher potential, the pulse width of PMW modulation signal Spwm becomes smaller. In this way, the pulse width of PMW modulation signal Spwm can be changed in accordance with circulation control command value Vpz, even by base line modulation of carrier signal CS.

Referring to FIG. 23, in the frequency modulation, the frequency of carrier signal CS changes in accordance with circulation control command value Vpz. In FIG. 23, a sawtooth pulse waveform is used as carrier signal CS.

In FIG. 23, the waveform of each single pulse forming carrier signal CS is the same, but the frequency it is generated (that is, the frequency of carrier signal CS) changes in accordance with circulation command value Vpz. Specifically, in the example in FIG. 23, the smaller the circulation voltage command value Vpz is, the higher the frequency of carrier signal CS is, and as a result, the pulse width of PMW modulation signal Spwm (gate signal ga) is smaller. Conversely, the larger the circulation control command value Vpz is, the lower the frequency of carrier signal CS is, and as a result, the pulse width of PMW modulation signal Spwm (gate signal ga) is larger. In this way, the pulse width of PMW modulation signal Spwm can be changed in accordance with circulation control command value Vpz, even by frequency modulation of carrier signal CS.

In this way, deficiency and excess of stored energy between converter cells 7 can also be controlled in accordance with circulation control command value Vzp generated using voltage evaluation value Vcg, even by the carrier signal modulation illustrated in FIG. 21 to FIG. 23. Since circulating current is typically much smaller than the magnitude of arm current, change in circulation control command value Vpz may fail to be sufficiently reflected in arm voltage command value kref, in the control of reflecting circulation control command value Vpz in arm voltage command value kref as illustrated in FIG. 5, due to the influence of quantization bit rate. By comparison, the control by the carrier signal modulation can be expected to improve accuracy in control of circulating current.

In FIG. 1, power converter 2 has a double star configuration and is mainly used for AC/DC converter for high voltage direct current (HVDC) transmission. However, the control of the power converter explained in the foregoing embodiments is applicable to power converters of any other configurations.

Figure 24:
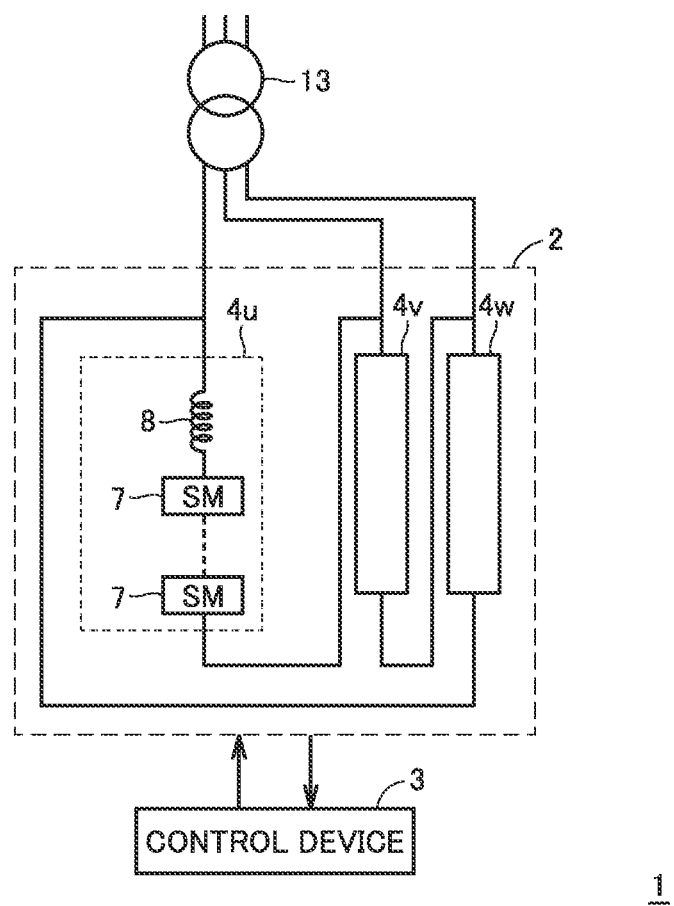
FIG. 24 is a circuit diagram illustrating a first modification of the configuration of the power conversion device.

For example, as shown in FIG. 24, the control described in the present embodiments can be applied to power converter 2 having a single delta configuration.

Figure 25:
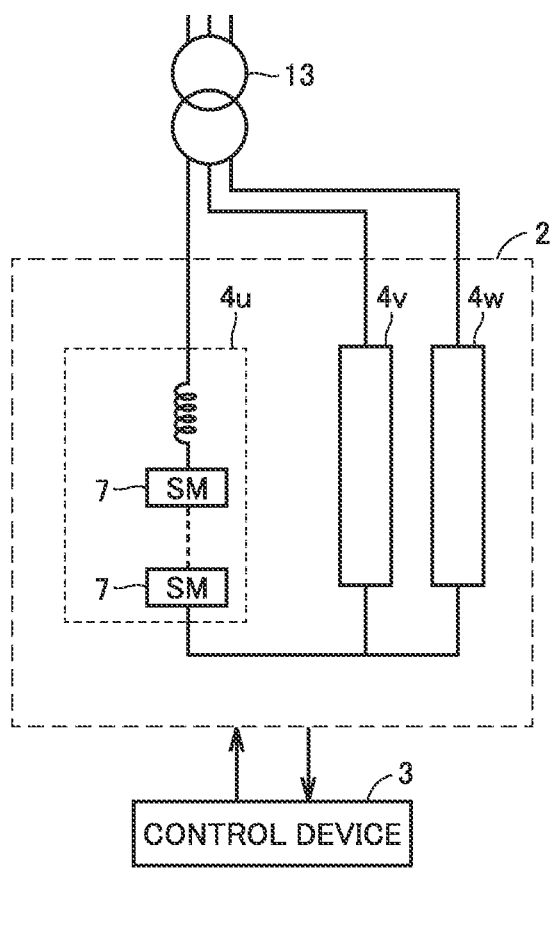
FIG. 25 is a circuit diagram illustrating a second modification of the configuration of the power conversion device.

Alternatively, as shown in FIG. 25, the control described in the present embodiments can be applied to power converter 2 having a single star configuration. It is known that the configurations of power converter 2 shown in FIG. 24 and FIG. 25 are applied mainly for static var compensators.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 1 power conversion device, 2 power converter, 3 control device, 4, 4u, 4v, 4w leg circuit, 5 upper arm, 6 lower arm, 7 converter cell, 8A, 8B reactor, 9A, 9B arm current detector, 10 AC voltage detector, 11A, 11B, 17 DC voltage detector, 12 AC circuit, 13 transformer, 14 DC circuit, 16 AC current detector, 31n2, 31n1, 31n, 31p, 31p2, 31p1 switching element, 32 capacitor (power storage element), 33 voltage detector, 70 input converter, 71 sample hold circuit, 72 multiplexer, 73 converter, 75 RAM, 76 ROM, 77 input/output interface, 78 auxiliary storage device, 79 bus, 202 individual cell controller, 203 carrier generator, 205 individual voltage controller, 206 adder, 207 gate signal generator, 501 switching control unit, 502, 502U, 502V, 502W basic controller, 503, 503UN, 503UP, 503VN, 503VP, 503WN, 503WP arm controller, 601 arm voltage command generator, 603 AC current controller, 604 circulating current calculator, 605 circulating current controller, 606 command distributor, 610 voltage macro controller, 611, 613 subtractor, 612 all voltage controller, 614 inter-group voltage controller, 615, 745 adder, 700 voltage evaluation value generator, 710 evaluation value calculator, 711 maximum value extractor, 712 minimum value extractor, 713 mean value calculator, 714 mode extractor, 715 representative value extractor, 716 random number generator, 717, 718 capacitor voltage estimator, 720 abnormal value eliminator, 725 output selector, 730, 730a, 730b filter, 740, 740a, 740b gain multiplier, Am modulation ratio command value, CLKn clock, CS carrier signal, Iacref AC current command value, Iacu, Iacy, Iacw AC current, Iarm arm current, Idc DC current, Iz circulating current, Izref circulating current command value, Nn low potential-side DC terminal, Np high potential-side DC terminal, Nu, Nv, Nw AC input terminal, P1, P2 input/output terminal, Spwm modulation signal, Ssl select signal, Vacu, Vacv, Vacw AC voltage, Vc capacitor voltage, Vcg voltage evaluation value, Vcgall all voltage evaluation value, Vcgr group voltage evaluation value, Vdcn, Vdcp DC voltage, Vdcref DC voltage command value, Vsn neutral point voltage, Vzp circulation control command value, ga gate signal, kref, krefn, krefp arm voltage command value, krefc cell voltage command value.

The invention claimed is:

1. A power conversion device comprising:
a power converter including at least one leg circuit including arms each having multiple converter cells cascaded to each other;
a current detector arranged for each arm; and
a control device to control the power converter,
each of the converter cells including
a pair of input and output terminals,
a plurality of switching elements,
a power storage element electrically connected to the input and output terminals through the switching elements, and
a voltage detector to detect a voltage of the power storage element,
the control device including
a voltage macro controller to control at least one of: deficiency and excess of stored energy of the power storage elements by all of the converter cells that constitute the power converter; and deficiency and excess of stored energy of the power storage elements by a plurality of converter cells included in each of a plurality of groups obtained by classifying the all of the converter cells in advance, and
a voltage evaluation value generator to calculate at least one of: a voltage evaluation value of each power storage element different from a mean value of respective voltage detection values of the power storage elements, for the all of the converter cells;

and a voltage evaluation value of the each power storage element different from a mean value of respective voltage detection values of the power storage elements, for the plurality of converter cells in each of the groups, wherein the voltage macro controller calculates a circulating current command value set in common to at least the plurality of converter cells for controlling deficiency and excess of the stored energy, based on the voltage evaluation value from the voltage evaluation value generator, and wherein the control device further includes:
- a circulating current calculator to calculate a circulating current value of the leg circuit by using arm current detected by the current detector; and
- a circulating current controller to generate a circulating control command value for perform control such that the circulating current value follows the circulating current command value, and the circulating control command value is reflected in an AC voltage command value set for each arm, and in each of the converter cells, ON and OFF of the switching elements is controlled in accordance with the AC voltage command.

2. The power conversion device according to claim 1, wherein
the voltage evaluation value generator includes an evaluation value calculator to calculate at least the voltage evaluation value for each of the groups,
the evaluation value calculator includes
a maximum value extractor to receive a plurality of voltage detection values by the voltage detectors of the plurality of converter cells included in a same group among the groups and extract a maximum value of the voltage detection values, and
the voltage evaluation value generator outputs the maximum value extracted by the maximum value extractor as the voltage evaluation value to the voltage macro controller.

3. The power conversion device according to claim 2, wherein
the voltage evaluation value generator includes
an abnormal value eliminator to receive the voltage detection values and eliminate an abnormal value from the voltage detection values, and
the voltage detection values processed by the abnormal value eliminator are input to the evaluation value calculator.

4. The power conversion device according to claim 2, wherein
the voltage evaluation value generator further includes
a filter to allow an output value of the evaluation value calculator to pass through,
the filter has a characteristic of averaging the output value, and
the voltage evaluation value generator outputs an output value of the filter as the voltage evaluation value to the voltage macro controller.

5. The power conversion device according to claim 1, wherein
the voltage evaluation value generator includes an evaluation value calculator to calculate at least the voltage evaluation value for each of the groups,
the evaluation value calculator includes
a minimum value extractor to receive a plurality of voltage detection values by the voltage detectors of the plurality of converter cells included in a same group among the groups and extract a minimum value of the voltage detection values, and
the voltage evaluation value generator outputs the minimum value extracted by the minimum value extractor as the voltage evaluation value to the voltage macro controller.

6. The power conversion device according to claim 1, wherein
the voltage evaluation value generator includes an evaluation value calculator to calculate at least the voltage evaluation value for each of the groups,
the evaluation value calculator includes
a maximum value extractor to receive a plurality of voltage detection values by the voltage detectors of the plurality of converter cells included in a same group among the groups and extract a maximum value of the voltage detection values,
a minimum value extractor to receive the voltage detection values in common to the maximum value extractor and extract a minimum value of the voltage detection values, and
a mean value calculator to calculate a mean value of the maximum value extracted by the maximum value extractor and the minimum value extracted by the minimum value extractor, and
the voltage evaluation value generator outputs the mean value calculated by the mean value calculator as the voltage evaluation value to the voltage macro controller.

7. The power conversion device according to claim 1, wherein
the voltage evaluation value generator includes an evaluation value calculator to calculate at least the voltage evaluation value for each of the groups,
the evaluation value calculator includes
a mode extractor to receive a plurality of voltage detection values by the voltage detectors of the plurality of converter cells included in a same group among the groups and extract a mode of the voltage detection values, and
the voltage evaluation value generator outputs the mode extracted by the mode extractor as the voltage evaluation value to the voltage macro controller.

8. The power conversion device according to claim 1, wherein
the voltage evaluation value generator includes an evaluation value calculator to calculate at least the voltage evaluation value for each of the groups,
the evaluation value calculator includes
a representative value extractor to receive a plurality of voltage detection values by the voltage detectors of the plurality of converter cells included in a same group among the groups, and
a select switch to switch a select signal for selecting one of the voltage detection values in accordance with a random number generated in certain cycles or a count value counted up in certain cycles,
the representative value extractor extracts one voltage detection value of the voltage detection values as a representative value in accordance with the select signal from the select switch, and
the voltage evaluation value generator outputs the representative value extracted by the representative value extractor as the voltage evaluation value to the voltage macro controller.

9. The power conversion device according to claim 1, wherein
in each of the converter cells, ON and OFF of the switching elements is controlled in accordance with pulse width modulation control based on comparison between the AC voltage command value set for each the arm and a periodical carrier signal,
the voltage evaluation value generator includes an evaluation value calculator to calculate the voltage evaluation value for each of the groups,
the group corresponds to each of a plurality of the arms,
the evaluation value calculator includes
a first voltage estimator to calculate a voltage estimation value of the each power storage element, using, for each the arm, a time integral value of a multiplication value of arm current detected by the current detector and a modulation ratio command value in the pulse width modulation control obtained from the AC voltage command value of the arm,
the first voltage estimator calculates the voltage estimation value in accordance with a value obtained by dividing the time integral value by a sum of capacitance values of the power storage elements of the plurality of converter cells included in each the arm, and
the voltage evaluation value generator outputs the voltage estimation value extracted by the first voltage estimator as the voltage evaluation value of the group to the voltage macro controller.

10. The power conversion device according to claim 9, wherein
the voltage evaluation value generator further includes
a filter to allow an output value of the evaluation value calculator to pass through,
the filter has a characteristic of extracting a change in the output value, and
the voltage evaluation value generator outputs an output value of the filter as the voltage evaluation value to the voltage macro controller.

11. The power conversion device according to claim 1, further comprising
a detector to detect input and output power of the power converter, wherein
the voltage evaluation value generator includes an evaluation value calculator to calculate the voltage evaluation value for the all of the converter cells,
the evaluation value calculator includes
a second voltage estimator to calculate a voltage estimation value of the each power storage element of the all of the converter cells, using a time integral value of the input and output power,
the second voltage estimator calculates the voltage estimation value in accordance with calculation of dividing the time integral value by a total value of capacitance values of the power storage elements of the all of the converter cells and further dividing by a voltage nominal value of each the power storage element, and
the voltage evaluation value generator outputs the voltage estimation value extracted by the second voltage estimator as the voltage evaluation value of the all of the converter cells to the voltage macro controller.

12. The power conversion device according to claim 1, wherein
the voltage evaluation value generator includes
a plurality of evaluation value calculators to calculate the voltage evaluation value by different schemes, and
an output select circuit to select one calculation value from among calculation values by the evaluation value calculators,
the output select circuit switches selection of the one calculation value in accordance with an operating condition of the power converter, and
the voltage evaluation value generator outputs the one calculation value selected by the output select circuit as the voltage evaluation value to the voltage macro controller.

13. A power conversion device comprising
a power converter including at least one arm having multiple converter cells cascaded to each other; and
a control device to control the power converter,
each of the converter cells including
a pair of input and output terminals,
a plurality of switching elements,
a power storage element electrically connected to the input and output terminals through the switching elements, and
a voltage detector to detect a voltage of the power storage element,
the control device including
a voltage macro controller to control at least one of: deficiency and excess of stored energy of the power storage elements by all of the converter cells that constitute the power converter; and deficiency and excess of stored energy of the power storage elements by a plurality of converter cells included in each of a plurality of groups obtained by classifying the all of the converter cells in advance, and
a voltage evaluation value generator to calculate at least one of: a voltage evaluation value of each power storage element different from a mean value of respective voltage detection values of the power storage elements, for the all of the converter cells; and a voltage evaluation value of the each power storage element different from a mean value of respective voltage detection values of the power storage elements, for the plurality of converter cells in each of the groups,
wherein the voltage macro controller calculates a control value set in common to at least the plurality of converter cells for controlling deficiency and excess of the stored energy, based on the voltage evaluation value from the voltage evaluation value generator, wherein
the voltage evaluation value generator includes
a plurality of evaluation value calculators to calculate the voltage evaluation value by different schemes, and
a plurality of filters to allow a plurality of output values from the evaluation value calculators to pass through,
a gain multiplier to output a plurality of multiplication values obtained by multiplying a plurality of output signals from the filters by a plurality of predetermined gains, and
an adder to add the multiplication values output from the gain multiplier, and output an addition value,
the voltage evaluation value generator outputs an output value of the adder as the voltage evaluation value to the voltage macro controller.

14. The power conversion device according to claim 13, further comprising a current detector arranged for each the arm, wherein
in each of the converter cells, ON and OFF of the switching elements is controlled in accordance with pulse width modulation control based on comparison between an AC voltage command value set for each the arm and a periodical carrier signal, the group corresponds to each of a plurality of the arms, the evaluation value calculators include first and second evaluation value calculators, the first evaluation value calculator includes
- a maximum value extractor to receive a plurality of voltage detection values by the voltage detectors of the plurality of converter cells included in a same group among the groups and extract a maximum value of the voltage detection values,
- a minimum value extractor to receive the voltage detection values in common to the maximum value extractor and extract a minimum value of the voltage detection values, and
- a mean value calculator to calculate a mean value of the maximum value extracted by the maximum value extractor and the minimum value extracted by the minimum value extractor, the first evaluation value calculator outputs the mean value calculated by the mean value calculator, the second evaluation value calculator includes
- a voltage estimator to calculate a voltage estimation value of the each power storage element, using, for each the arm, a time integral value of a multiplication value of arm current detected by the current detector and a modulation ratio command value in the pulse width modulation control obtained from the AC voltage command value of the arm, the voltage estimator calculates the voltage estimation value in accordance with a value obtained by dividing the time integral value by a sum of capacitance values of the power storage elements of the plurality of converter cells included in each the arm, and the second evaluation value calculator outputs the voltage estimation value calculated by the voltage estimator, the filters include
- a first filter to allow an output value of the first evaluation value calculator to pass through, and
- a second filter to allow an output value of the second evaluation value calculator to pass through, the first filter has a characteristic of averaging the output value of the first evaluation value calculator, the second filter has a characteristic of extracting a change in the output value of the second evaluation value calculator, the gains include
- a first gain to be multiplied by an output value of the first filter, and
- a second gain to be multiplied by an output value of the second filter, a sum of the first and second gains is 1.0, and the adder adds a first multiplication value in accordance with the first gain and a second multiplication value in accordance with the second gain and outputs an addition value.

* * * * *